(12) United States Patent
Tojima

(10) Patent No.: US 7,542,187 B2
(45) Date of Patent: Jun. 2, 2009

(54) IMAGE FORMING APPARATUS, CONTROL METHOD THEREFOR, AND COMPUTER PROGRAM

(75) Inventor: Kenzo Tojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/167,842

(22) Filed: Jul. 3, 2008

(65) Prior Publication Data

US 2009/0015895 A1    Jan. 15, 2009

(30) Foreign Application Priority Data

Jul. 10, 2007    (JP)    ............................... 2007-181449

(51) Int. Cl.
*G02B 26/08* (2006.01)
*B41J 2/47* (2006.01)

(52) U.S. Cl. ....................... 359/198; 359/199; 347/225

(58) Field of Classification Search ........................ None
See application file for complete search history.

(56) References Cited

U.S. PATENT DOCUMENTS

| | | | |
|---|---|---|---|
| 4,317,611 A | 3/1982 | Petersen | |
| 5,606,447 A | 2/1997 | Asada et al. | |
| 6,008,826 A | 12/1999 | Foote et al. | |
| 7,271,943 B2 | 9/2007 | Yasuda et al. | |
| 2004/0085439 A1 | 5/2004 | Takaki | |
| 2004/0125199 A1* | 7/2004 | Omori et al. | ................. 347/249 |
| 2006/0158711 A1* | 7/2006 | Imai et al. | .................... 359/204 |

FOREIGN PATENT DOCUMENTS

| | | |
|---|---|---|
| JP | 57-008520 | 1/1982 |
| JP | 62-243467 | 10/1987 |
| JP | 7-175005 | 7/1995 |
| JP | 11-327249 | 11/1999 |
| JP | 2004-268569 | 9/2004 |
| JP | 2005-208578 | 8/2005 |

* cited by examiner

*Primary Examiner*—James Phan
(74) *Attorney, Agent, or Firm*—Cowan, Liebowitz & Latman, P.C.

(57) ABSTRACT

An image forming apparatus which forms an image by scanning a light beam in a main-scan direction of a photosensitive member, the apparatus including: an output unit which irradiates a light beam for exposing the photosensitive member; a deflection unit which deflects a light beam from the output unit to scan the photosensitive member in the main-scan direction; a light-receiving unit which detects the light beam deflected by the deflection unit; a computation unit which calculates difference information by using information of a detected time; a control unit which drives the deflection unit by setting a parameter for controlling operation of the deflection unit; a prediction unit which predicts a correction amount of a scan width in the main-scan direction in a next scan; a modulation unit which generates a driving signal for driving the output unit; and a driving unit which drives the output unit.

16 Claims, 16 Drawing Sheets

IMAGE FORMING APPARATUS, CONTROL METHOD THEREFOR, AND COMPUTER PROGRAM

BACKGROUND OF THE INVENTION

1. Field of the Invention

The present invention relates to an image forming apparatus, a control method therefor, and a computer program.

2. Description of the Related Art

Various types of light deflectors which are swing bodies making mirrors resonate have been proposed.

A resonant swing body is characterized by allowing a great reduction in size, having low power consumption, being theoretically free from plane tilt, and the like as compared with an optical system designed to perform optical scanning by using a rotating polygon mirror such as a polygon mirror. A swing body comprising an Si single crystal manufactured by a semiconductor process, in particular, is characterized by being theoretically free from fatigue of metals and excellent in durability (see Japanese Patent Laid-Open No. 57-8520).

In the field of image forming apparatuses using electrophotography, reductions in size and cost are required. In order to meet this requirement, there has been proposed a method using a galvanometer mirror which is a resonant swing body manufactured by a semiconductor process in place of a polygon mirror which has been conventionally used (see Japanese Patent Laid-Open No. 7-175005). According to this method, a galvanometer mirror is made to resonate at a resonance frequency unique to the size of the mirror to scan a light beam in the main-scan direction, thereby forming an image. This galvanometer mirror can be reduced in size by using a semiconductor process, and many mirrors can be manufactured at once. Therefore, a reduction in cost can be expected.

A nested mirror (see Japanese Patent Laid-Open No. 2005-208578) has the property of achieving an almost constant velocity in the scanning range to be used and the property of allowing a large scanning angle to be set. This can form a correction optical system with a simple arrangement, which is suitable for a scanning apparatus in a compact, low-cost image forming apparatus.

When a light beam is deflected by making a swing mirror resonate using the above technique, resonance fluctuations are caused by air turbulence due to the air resistance to the swing mirror at the time of resonance. This may cause non-periodic jitter.

This jitter appears as the angular velocity jitter of the swing mirror and pixel formation position jitter in the main-scan direction, resulting in width variations in the main-scan direction, as indicated by a transfer medium 101 in FIG. 1. As a consequence, straight lines wobble at the center and end portions on a transfer medium, resulting in deterioration in image quality.

SUMMARY OF THE INVENTION

The present invention reduces low frequency component jitter in the main-scan direction which occurs for each line and keeps image formation positions in the sub-scan direction at the center and end portions on a transfer medium in a better state.

According to one aspect of the present invention, an image forming apparatus which forms an image by scanning a light beam in a main-scan direction of a photosensitive member, the apparatus comprising:

an output unit which irradiates a light beam for exposing the photosensitive member;

a deflection unit which deflects a light beam from the output unit to scan the photosensitive member in the main-scan direction;

a light-receiving unit which detects the light beam deflected by the deflection unit;

a computation unit which calculates difference information by using information of a detected time based on a timing at which the light beam is detected by the light-receiving unit;

a control unit which drives the deflection unit by setting a parameter for controlling operation of the deflection unit based on the difference information;

a prediction unit which predicts a correction amount of a scan width in the main-scan direction in a next scan based on the difference information;

a modulation unit which generates a driving signal for driving the output unit based on image data and the correction amount; and a driving unit which drives the output unit based on the driving signal.

According to another aspect of the present invention, a control method for an image forming apparatus which comprises an output unit which irradiates a light beam for exposing a photosensitive member, a deflection unit which deflects a light beam from the output unit to scan the photosensitive member in the main-scan direction, and a light-receiving unit which detects the light beam deflected by the deflection unit, and forms an image by scanning a light beam in the main-scan direction of the photosensitive member, the method comprising:

a difference computation step of calculating difference information by using information of a detected time based on a timing at which the light beam is detected by the light-receiving unit;

a control step of driving the deflection unit upon setting a parameter for controlling operation of the deflection unit based on the difference information;

a prediction step of predicting a correction amount for a scan width in the main-scan direction in a next scan based on the difference information;

a modulation step of generating a driving signal for driving the output unit based on image data and the correction amount; and a driving step of driving the output unit based on the driving signal.

According to still another aspect of the present invention, a computer program for causing an image forming apparatus which comprises an output unit which irradiates a light beam for exposing a photosensitive member, a deflection unit which deflects a light beam from the output unit to scan the photosensitive member in the main-scan direction, and a light-receiving unit which detects the light beam deflected by the deflection unit, and forms an image by scanning a light beam in the main-scan direction of the photosensitive member to function as a difference computation unit which calculates difference information by using information of a detected time based on a timing at which the light beam is detected by the light-receiving unit, a control unit which drives the deflection unit upon setting a parameter for controlling operation of the deflection unit based on the difference information, a prediction unit which predicts a correction amount for a scan width in the main-scan direction in a next scan based on the difference information, a modulation unit which generates a driving signal for driving the output unit based on image data and the correction amount, and a driving unit which drives the output unit based on the driving signal.

Further features of the present invention will become apparent from the following description of exemplary embodiments (with reference to the attached drawings).

DESCRIPTION OF THE EMBODIMENTS

The embodiments of the present invention will be described below with reference to the accompanying drawings.

An example of the arrangement of a deflector corresponding to an embodiment of the present invention will be described with reference to FIG. 2.

Figure 2:
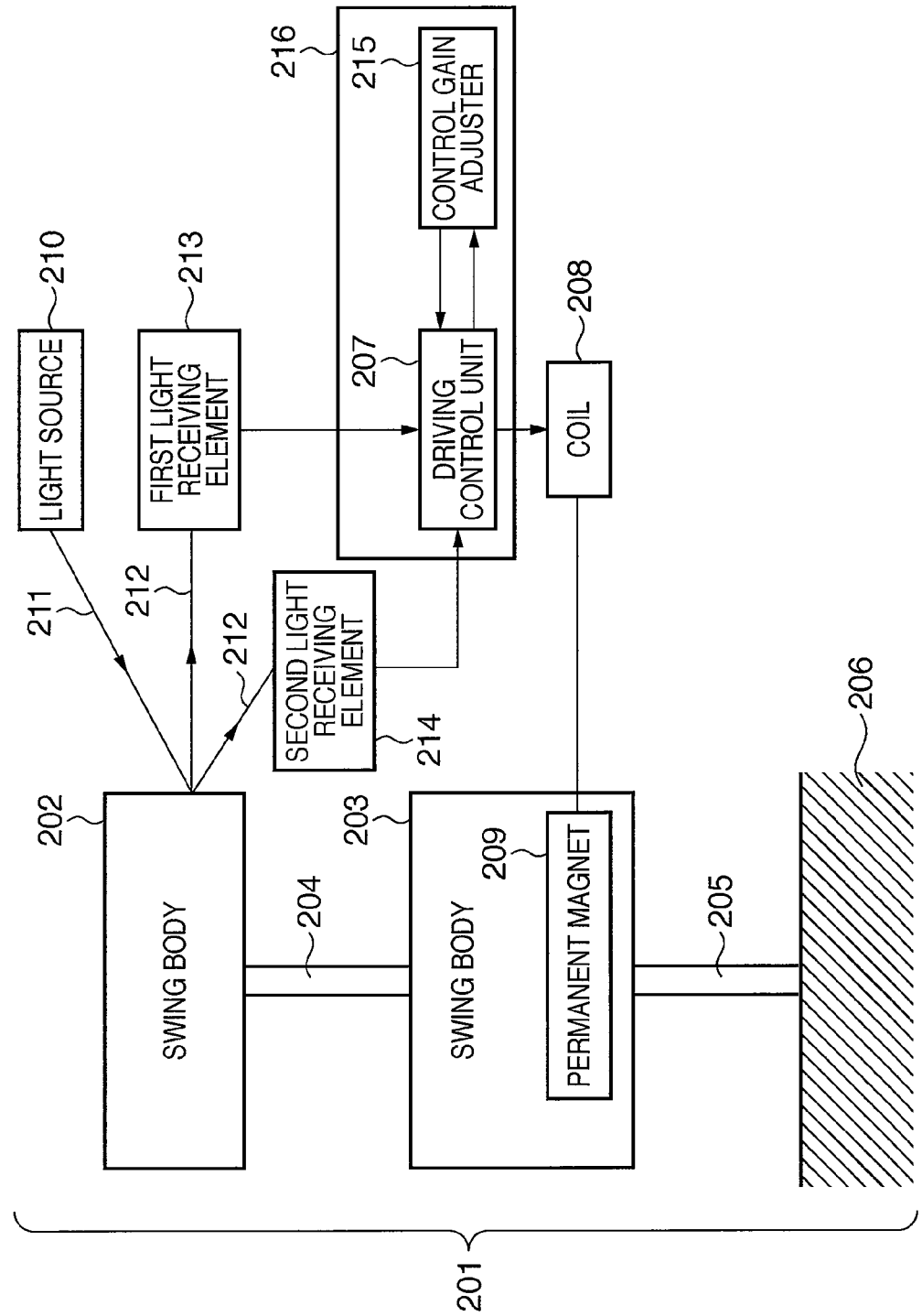
FIG. 2 is a block diagram showing an example of the arrangement of a deflector corresponding to an embodiment of the present invention.

Referring to FIG. 2, a vibration system 201 includes swing bodies 202 and 203. The vibration system 201 is provided with a torsion spring 204 which directly couples the swing bodies 202 and 203 with each other and a torsion spring 205 which couples the swing body 203 to a support portion 206.

A driving control unit 207 applies, to the swing body 203, driving forces to simultaneously excite a plurality of normal modes of vibration in the vibration system 201 using electromagnetic force, electrostatic force, piezoelectric force, or the like. In this embodiment, the driving control unit 207 sends a signal which performs control to supply a proper current to a coil 208. The current flowing in the coil 208 makes a torque act on a permanent magnet 209 mounted on the swing body 203, thereby driving the vibration system 201. An adjuster 215 adjusts control gains in the driving control unit 207. In this embodiment, the mechanism mainly comprising the driving control unit 207 and the adjuster 215 will be referred to as a driving control mechanism 216.

The swing body 202 scans a light beam 211 from a light source 210 having a mirror on the surface. A scanning beam 212 passes through first and second light receiving elements 213 and 214 twice in reciprocating scanning operation at each period. The driving control unit 207 generates a signal for supplying a proper current to the coil 208 based on the time taken for the scanning beam 212 to pass through each of the first and second light receiving elements 213 and 214 twice.

Figure 3:
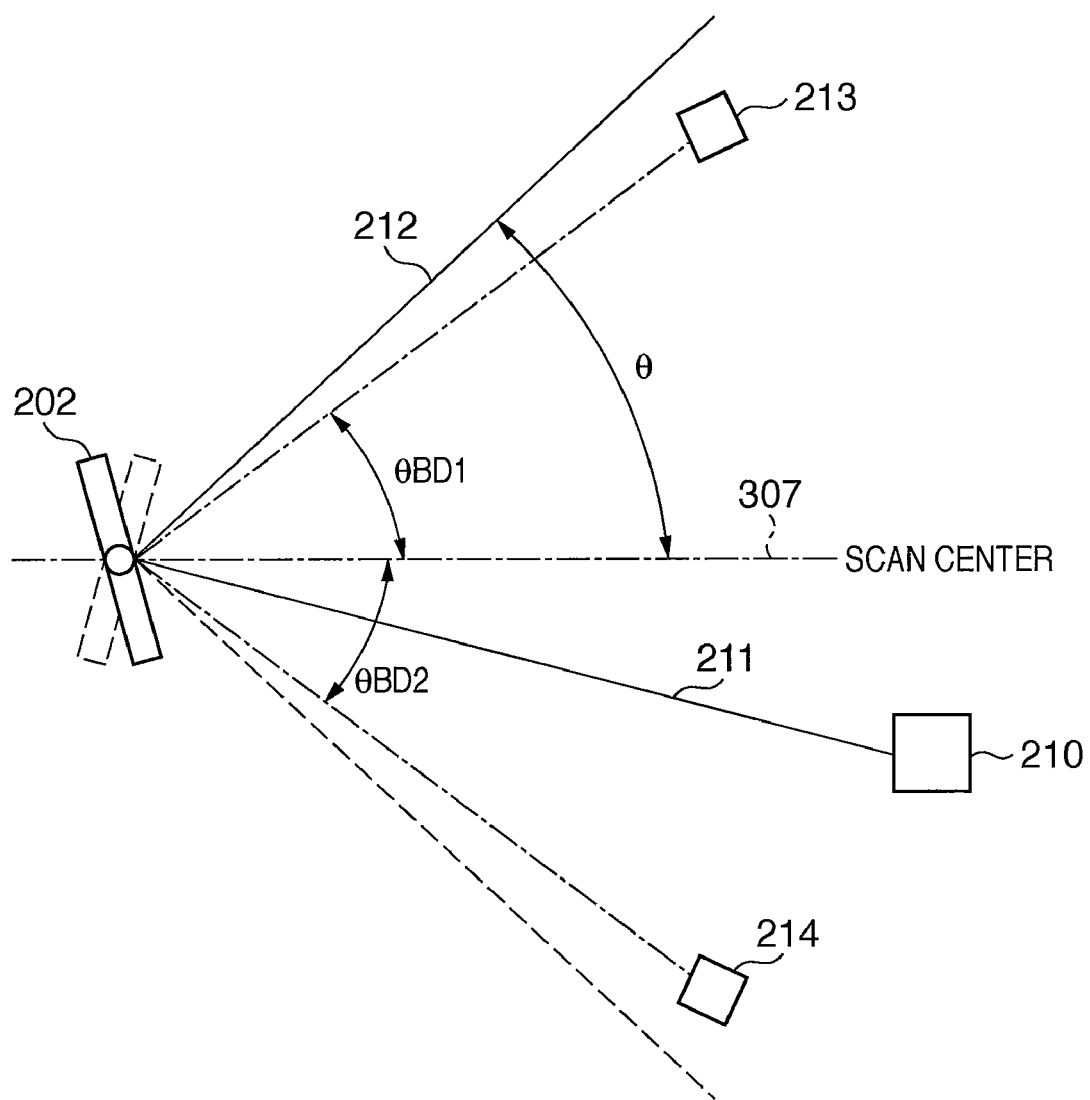
FIG. 3 is a view for explaining a deflection angle (scanning angle) in the deflector corresponding to the embodiment of the present invention.

A deflection angle (scanning angle) in the deflector of this embodiment will be described next with reference FIG. 3. The same reference numerals denote the elements shown in FIG. 3 which correspond to constituent elements shown in FIG. 2.

The swing body 202 scans the light beam 211 from the light source 210 having a reflecting mirror on the surface. The deflector includes two light receiving elements. The first and second light receiving elements 213 and 214 are respectively arranged at deflection angle positions (positions of θBD1 and θBD2) smaller than the maximum deflection angle of the deflector. Referring to FIG. 3, the first and second light receiving elements 213 and 214 are arranged at positions where they are directly irradiated with scanning beams from the deflector. As described above, however, the first and second light receiving elements 213 and 214 can be arranged at positions where they are irradiated with scanning beams further deflected by another reflecting mirror (reflecting member) or the like.

A deflection angle θ (measured with reference to the position of a scan center 307 shown in FIG. 3) of the deflector of this embodiment can be expressed as follows:

$$\theta(t) = A1 \sin(\omega 1 t + \phi 1) + A2 \sin(\omega 2 t + \phi 2) \quad (1)$$

where A1, ω1, and φ1 are the amplitude, angular frequency, and phase of the first vibrational motion, respectively, A2, ω2, and φ2 are the amplitude, angular frequency, and phase of the second vibrational motion, respectively, and t is the time when a proper time is set as an origin or reference time.

The deflection angle θ of the deflector can also be expressed as follows:

$$\theta(t) = A1 \sin(\omega 1 t) + A2 \sin(\omega 2 t + \phi) \quad (2)$$

or $$\theta(t) = A1 \sin(\omega 1 t + \phi) + A2 \sin(\omega 2 t) \quad (3)$$

where A1 and ω1 are the amplitude and angular frequency of the first vibrational motion, respectively, A2 and ω2 are the amplitude and angular frequency of the second vibrational motion, respectively, φ is the relative phase of two frequencies, and t is the time when a proper time is set as a reference time.

Equation (3) corresponds to a case in which it is possible to control the phase on the fundamental wave ω1 side at the time of control. Equations (1) to (3) are essentially the same in that each contains four unknown values (for example, φ in equations (2) and (3) can be expressed as φ1−φ2 or φ2−φ1) except that they are expressed in different forms in terms of how a reference or origin time is set.

In this case, the first and second light receiving elements 213 and 214 are arranged at desired positions where they are irradiated with a scanning beam. The amplitudes and phases of the first and second vibrational motions are adjusted to make a scanning beam pass over the first and second light receiving elements 213 and 214 at four desired times different from each other in one period of the first vibration motion. In this manner, four unknown values are determined. This makes it possible to obtain a desired arbitrary deflection angle θ of the deflector. In this case, letting θBD1 and θBD2 (see FIG. 3) be deflection angles corresponding to the positions of the first and second light receiving elements 213 and 214, the four times are given as follows:

At given times t1 and t2, $$\theta(t1)=\theta(t2)=\theta BD1 \quad (4)$$

At given times t3 and t4, $$\theta(t3)=\theta(t4)=\theta BD2 \quad (5)$$

The driving control unit 207 controls to set the four times t1 (first timing), t2 (second timing), t3 (third timing), and t4 (fourth timing) to desired arbitrary times t10, t20, t30, and t40, respectively. This makes it possible to uniquely determine the amplitudes and phases of the first and second vibration motions. More specifically, the driving control unit 207 controls the amplitudes and phases or relative phase of the first and second vibrational motions by controlling to supply a proper current to the coil 208 so as to set the four times to arbitrary times.

If the deflection angle θ of the deflector is expressed by only one of the terms of equation (1), it suffices to adjust the amplitude and phase of the first or second vibrational motion to make a scanning beam pass over the first or second light receiving element 213 or 214 at at least two desired times.

Assume that it suffices to control the amplitudes of the first and second vibrational motions and the relative phase of the first and second vibrational motions. In this case, it suffices to consider the relative times between the four times t1, t2, t3, and t4. More specifically, for example, of the target times t10, t20, t30, and t40 at which a scanning beam passes through the first and second light receiving elements 213 and 214, the time t10 is set as a reference time.

The driving control unit 207 controls driving signals such that three detected relative times t2−t1, t3−t1, and t4−t1 at which the scanning beam 212 passes through the first and second light receiving elements 213 and 214 are set to target relative times t20−t10, t30−t10, and t40−t10. This makes it possible to control the amplitudes of the first and second vibrational motions and the relative phase between the first vibrational motion and the second vibrational motion.

Letting Δt2, Δt3, and Δt4 be time differences as difference information between the detected relative times and the target relative times, the time differences Δt2, Δt3, and Δt4 are expressed by $$\Delta ti = ti - ti0 = (ti-t1) - (ti0-t10), (i=, 2, 3, 4) \quad (6)$$

A control method according to this embodiment will be described in detail. Coefficients and a matrix M representing changes in the detected relative times t2−t1, t3−t1, and t4−t1 at which the scanning beam 212 passes through the first and second light receiving elements 213 and 214 when a control parameter X containing one of A1, A2, and φ of the deflector minutely changes from a target value are obtained in advance. They are expressed as follows:

$$\left.\frac{\partial t}{\partial X}\right|_{ti} - \left.\frac{\partial t}{\partial X}\right|_{t1}, (X=A1, A2, \phi), (i=2,3,4) \quad (7)$$

$$M = \begin{bmatrix} \left.\frac{\partial t}{\partial A1}\right|_{t2} - \left.\frac{\partial t}{\partial A1}\right|_{t1} & \left.\frac{\partial t}{\partial A2}\right|_{t2} - \left.\frac{\partial t}{\partial A2}\right|_{t1} & \left.\frac{\partial t}{\partial \phi}\right|_{t2} - \left.\frac{\partial t}{\partial \phi}\right|_{t1} \\ \left.\frac{\partial t}{\partial A1}\right|_{t3} - \left.\frac{\partial t}{\partial A1}\right|_{t1} & \left.\frac{\partial t}{\partial A2}\right|_{t3} - \left.\frac{\partial t}{\partial A2}\right|_{t1} & \left.\frac{\partial t}{\partial \phi}\right|_{t3} - \left.\frac{\partial t}{\partial \phi}\right|_{t1} \\ \left.\frac{\partial t}{\partial A1}\right|_{t4} - \left.\frac{\partial t}{\partial A1}\right|_{t1} & \left.\frac{\partial t}{\partial A2}\right|_{t4} - \left.\frac{\partial t}{\partial A2}\right|_{t1} & \left.\frac{\partial t}{\partial \phi}\right|_{t4} - \left.\frac{\partial t}{\partial \phi}\right|_{t1} \end{bmatrix} \quad (8)$$

Manipulated variables ΔA1, ΔA2, and Δφ of the amplitudes and phase of the mirrors are determined by the time differences Δt2, Δt3, and Δt4 between the detected relative times t2−t1, t3−t1, and t4−t1 and the target relative times t20−t10, t30−t10, and t40−t10 according to the following equation:

$$\begin{bmatrix} \Delta A1 \\ \Delta A2 \\ \Delta \phi \end{bmatrix} = M^{-1} \begin{bmatrix} \Delta t2 \\ \Delta t3 \\ \Delta t4 \end{bmatrix} \quad (9)$$

The manipulated variables ΔA1, ΔA2, and Δφ are calculated from the time differences Δt2, Δt3, and Δt4 by the above equation. The output of the driving control unit 207 is changed based on the calculated values. Repeating the above control makes the detected relative times t2−t1, t3−t1, and t4−t1 converge to the target relative times t20−t10, t30−t10, and t40−t10, thereby obtaining a desired deflection angle θ.

The above steps will be described with reference to the block diagram of FIG. 4. The same reference numerals denote the elements shown in FIG. 4 which correspond to constituent elements shown in FIG. 2.

The vibration system 201 deflects light from the light source 210 to make the scanning beam 212 pass through the first and second light receiving elements 213 and 214. A counter 406 calculates a detected time 452 from a detection signal 451 detected by the first and second light receiving elements 213 and 214. The driving control unit 207 performs difference operation by using the detected time 452 and a target time 453 and calculates a time difference 454 as difference information.

Figure 4:
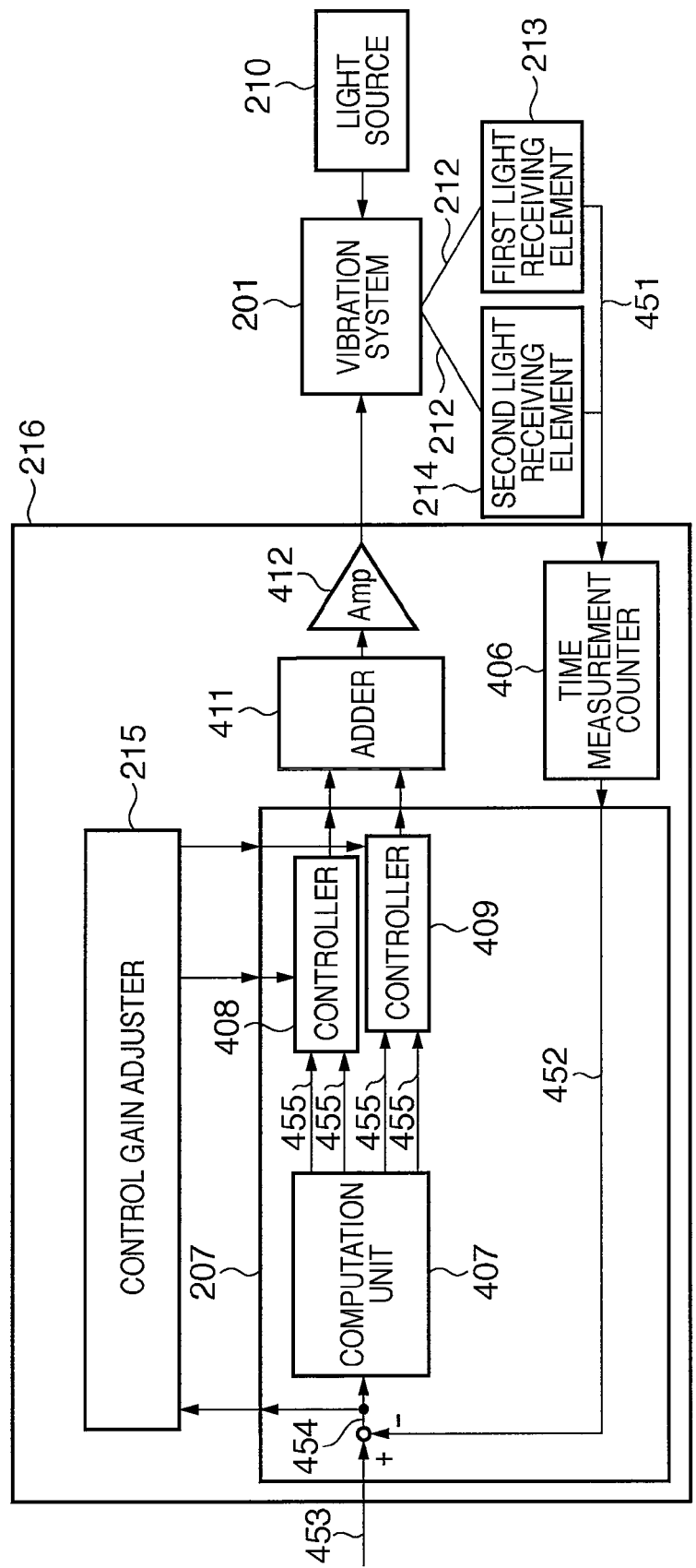
FIG. 4 is a block diagram showing the operation of the deflector corresponding to the embodiment of the present invention.

The arrows attached to 452, 453, and 454 in FIG. 4 indicate that several pieces (three in this case) of time information are transmitted. As indicated by equation (9), a computation unit 407 calculates a manipulated variable 455 from the time difference 454 by matrix computation. Controllers 408 and 409, an adder 411, and an amplifier 412 generate a signal to be input to the drive (coil) of the vibration system 201. In this case, since the time t10 is a reference time, the number of manipulated variables 455 to the controller 408 shown in FIG. 4 is one instead of two, or the number of manipulated variables 455 to the controller 409 is one instead of two. That is, either of the controllers 408 and 409 can adjust the difference φ between the phases of two frequencies.

In addition to the above arrangement, this embodiment is configured to input the time differences Δt2, Δt3, and Δt4 to the adjuster 215. The adjuster 215 outputs signals for adjusting the control gains of the controllers 408 and 409 to adjust the control gains based on the time differences Δt2, Δt3, and Δt4.

The deflector of this embodiment includes the two light receiving elements 213 and 214 constituting a mechanism for detecting a displacement angle. The two light receiving elements are provided to detect that the scanning beam 212 reflected by the vibration system 201 is located at two different scanning angles. However, two light receiving elements need not be used. For example, a reflecting plate can be placed at the position of the second light receiving element 214 in FIG. 3 to deflect the scanning beam 212 so as to make it pass through the first light receiving element 213 directly or via at least one reflecting member. In this case, one light receiving element can detect four different timings (times) in one period of vibrational motion. Setting the four timings (times) to t1, t2, t3, and t4, respectively, makes it possible to apply this embodiment to even a deflector having only one light receiving element.

Figure 5:
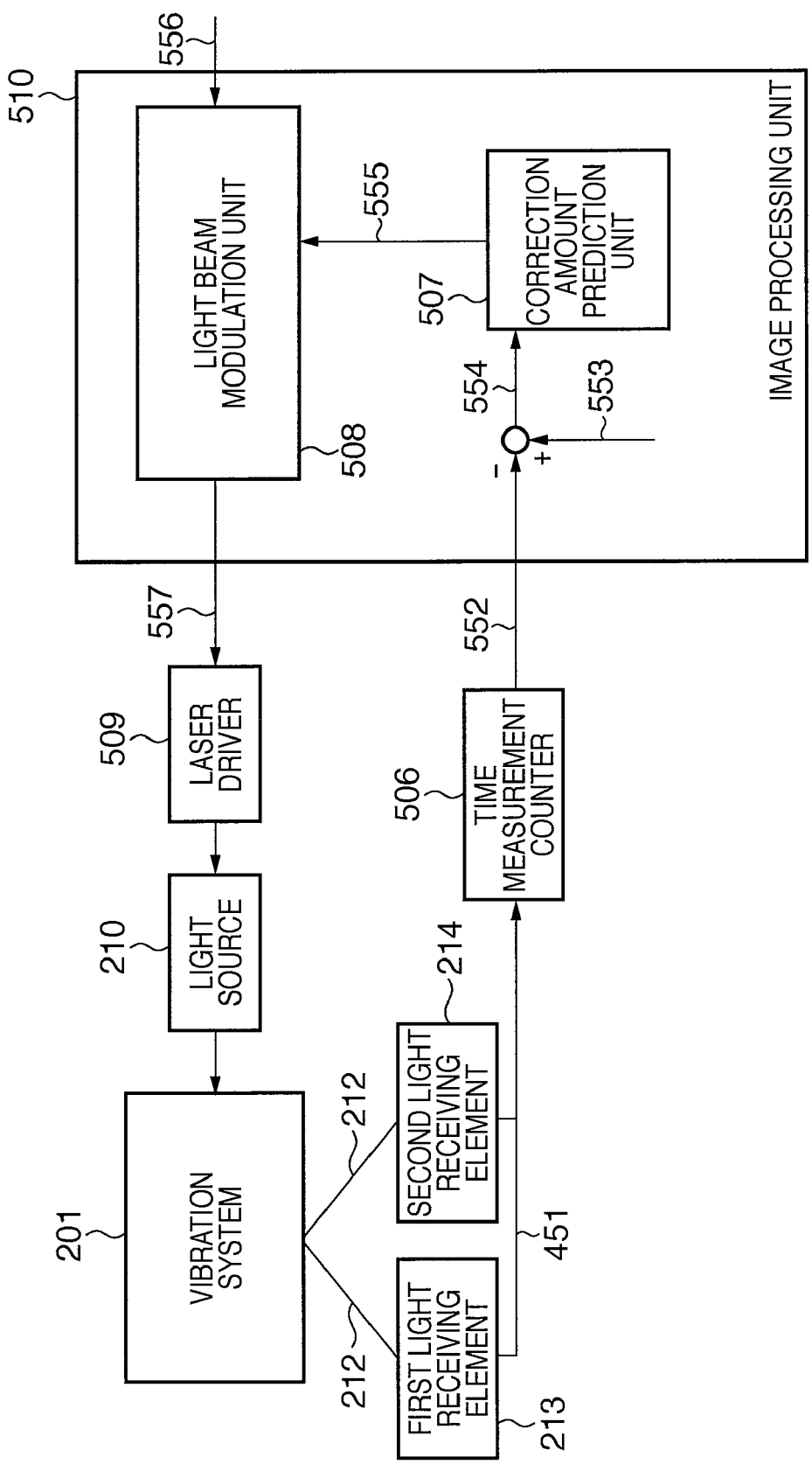
FIG. 5 is a block diagram showing an example of the arrangement of a light beam driving mechanism corresponding to the embodiment of the present invention.

An embodiment of a light beam driving unit of the image forming apparatus according to this embodiment of the present invention will be described next with reference to FIG. 5. FIG. 5 is a block diagram showing an example of the arrangement of the light beam driving unit corresponding to the embodiment of the present invention. The same reference numerals denote the elements shown in FIG. 5 which correspond to constituent elements shown in the other drawings.

Referring to FIG. 5, when the vibration system 201 deflects light from the light source 210 as an output unit, the scanning beam 212 passes through the first and second light receiving elements 213 and 214. A counter 506 calculates a detected time 552 from the detection signal 451 detected by the first and second light receiving elements 213 and 214. An image processing unit 510 calculates a time difference 554 by performing difference operation using the detected time 552 and a target time 553. The arrows attached to 552, 553, and 554 in FIG. 5 indicate that several pieces (three in this case) of time information are transmitted.

A prediction unit 507 predicts a correction amount 555 for modulating a light beam in the next scan by using the time differences Δt2, Δt3, and Δt4 between the detected relative times t2−t1, t3−t1, and t4−t1 and the target relative times t20−t10, t30−t10, and t40−t10. In this predicting operation, the prediction unit 507 can perform prediction based on the time differences Δt2, Δt3, and Δt4 or can calculate the manipulated variables ΔA1, ΔA2, and Δϕ by equation (9) and perform prediction based on the calculated variables.

Referring to FIG. 5, the input to the prediction unit 507 is the time difference 454. However, it suffices to input the manipulated variable 455 in FIG. 4 to this unit. Alternatively, the unit may perform prediction by using the history of time difference information in an immediately preceding scan or perform prediction by using the history of a plurality of pieces of time difference information in an immediately preceding scan or preceding scans.

A modulation unit 508 controls a laser driver 509 by generating a light beam driving signal 557 for correcting the total or partial magnification of image data 556 based on the manipulated value 555 calculated by the prediction unit 507. Note that as a magnification correction method, it suffices to use a method of correcting the total and partial magnifications by intermittently increasing or decreasing the pulse width of a light beam or a method of correcting the total and partial magnifications by increasing or decreasing the pulse width of a light beam in the form of a uniform distribution. The laser driver 509 also controls the power of a light beam from the light source 210 based on the input light beam driving signal 557.

Figure 6:
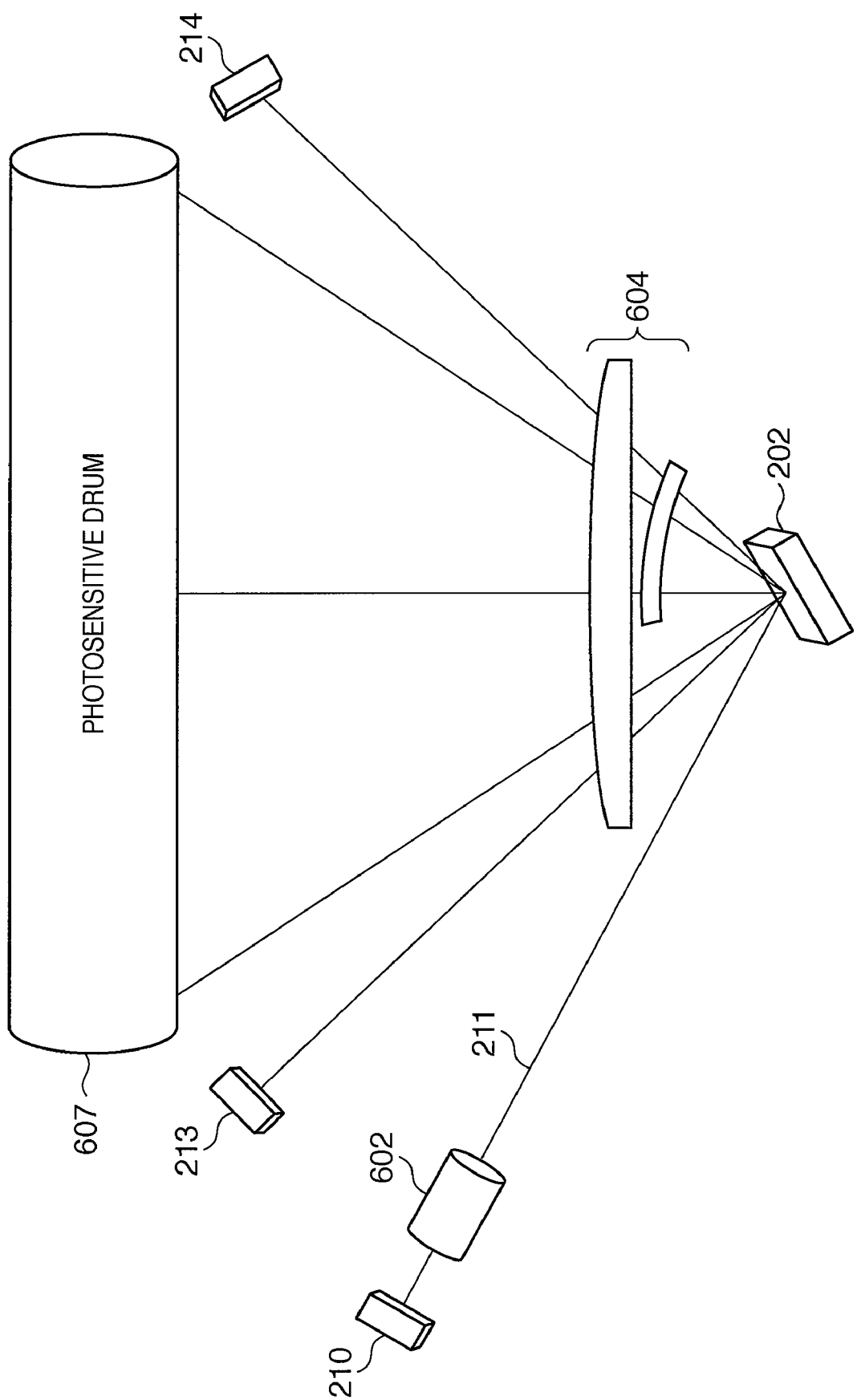
FIG. 6 is a view for explaining how exposure is performed in an image forming apparatus corresponding to the embodiment of the present invention.

The manner of performing exposure on a photosensitive drum in the image forming apparatus corresponding to this embodiment will be described next with reference to FIG. 6. FIG. 6 is a view for explaining how exposure is performed on the photosensitive drum. The same reference numerals denote the elements shown in FIG. 6 which correspond to constituent elements shown in the other drawings.

Referring to FIG. 6, a collimator lens 602 shapes the light emitted from the light source 210 as an output unit, and the swing body 202 then one-dimensionally deflects the light. The scanning beam is formed into an image on a photosensitive drum 607 via a coupling lens 604. The two light receiving elements 213 and 214 are arranged at positions corresponding to the deflection angle of the swing body 202 located outside the range defining the effective area of the photosensitive drum 607. The angular velocity of the deflection angle of the swing body 202 is controlled to be almost uniform in a predetermined region (an almost uniform angular velocity region). As a result, since the coupling lens 604 is made to have a so-called fθ function, light can be scanned on the effective area of the photosensitive drum 607 at an almost uniform velocity. This embodiment can implement preferable printing because a change in angular velocity is smaller than in the case of sine wave driving.

Referring to FIG. 6, the two light receiving elements 213 and 214 are arranged. As described above, however, two light receiving elements need not be used. If this apparatus has at least one light receiving element, the apparatus may be configured to deflect a scanning beam by a reflecting plate placed at the position of a deflection angle to be detected and to make the deflected light pass through the light receiving element directly or via at least one reflecting member.

The image forming apparatus having the arrangement combining FIGS. 2 to 6 will be described with reference to FIG. 7.

Figure 7:
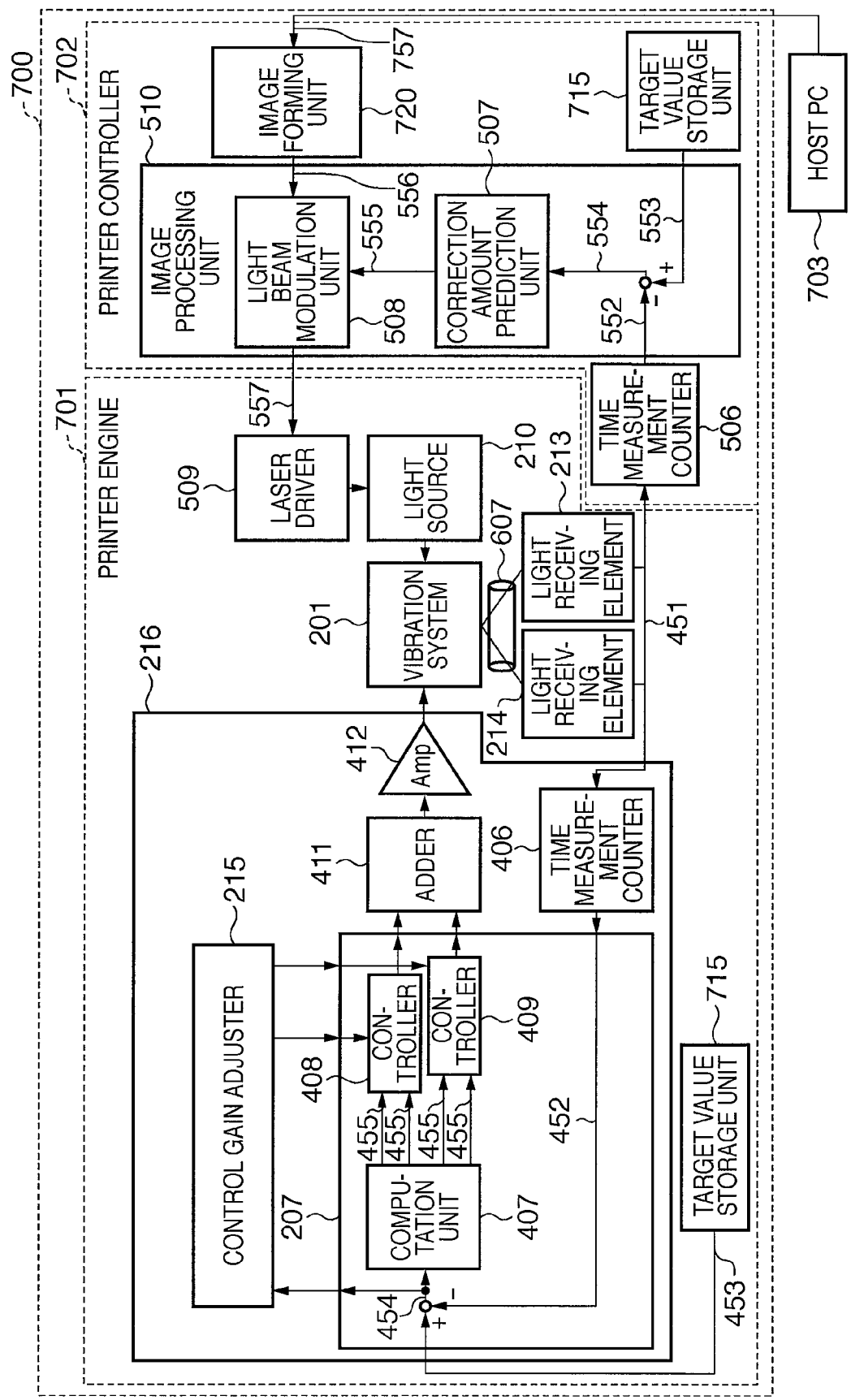
FIG. 7 is a block diagram showing an example of the arrangement of the image forming apparatus corresponding to the embodiment of the present invention.

Referring to FIG. 7, an image forming apparatus 700 roughly comprises two constituent elements, a printer engine 701 and a printer controller 702. Of these constituent elements, the printer engine 701 comprises the mechanism shown in FIGS. 2 to 4 and 6, the laser driver 509, and a target value storage unit 715. The printer controller 702 comprises the counter 506 and image processing unit 510 shown in FIG. 5, the target value storage unit 715, and an image forming unit 720. This arrangement allows the driving control mechanism 216 and the image processing unit 510 to concurrently perform driving control and image processing (jitter correction), respectively.

Referring to FIG. 7, the printer controller 702 performs overall control on the image forming apparatus 700 by using a CPU (not shown). The printer controller 702 generates the light beam driving signal 557 which can be output to the printer engine 701 from print data 757 received from an external host PC 703 of the image forming apparatus 700. The image forming unit 720 in the printer controller 702 performs an image process or the like by analyzing the print data 757 which the printer controller 702 externally receives, and generates the image data 556. The image processing unit 510 outputs the generated image data 556 to the laser driver 509 in accordance with the request timing of a vertical synchronizing signal output from the printer engine 701.

Referring to FIG. 7, the printer engine 701 transmits the detection signal 451 to the printer controller 702, and receives the light beam driving signal 557 from the printer controller 702. However, the arrangement of the image forming apparatus is not limited to this.

Figure 8:
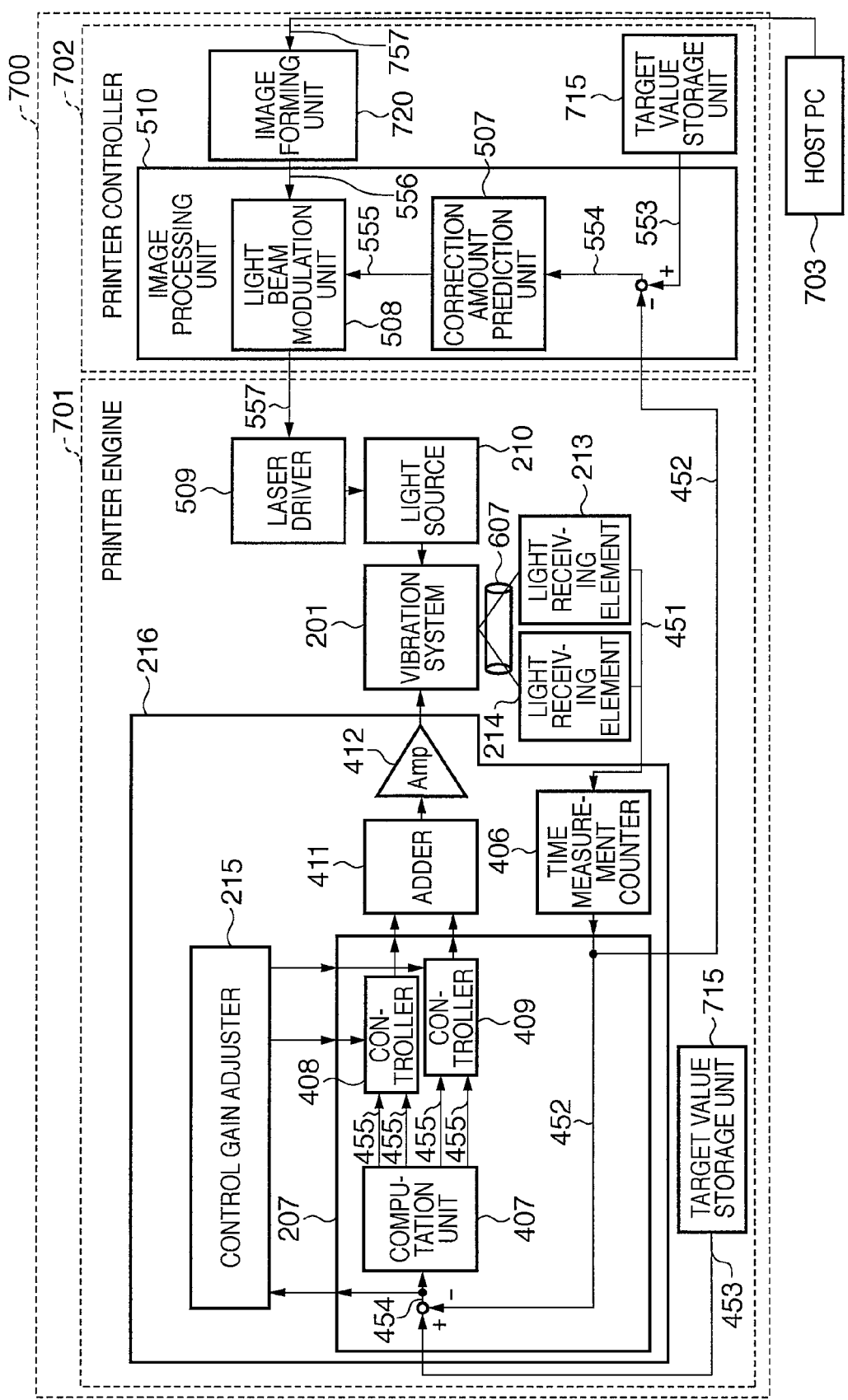
FIG. 8 is a block diagram showing another example of the arrangement of the image forming apparatus corresponding to the embodiment of the present invention.

For example, as shown in FIG. 8, the printer engine 701 may transmit the detected time 452 measured by the counter 406 to the printer controller 702, and receive the light beam driving signal 557 from the printer controller 702.

Figure 9:
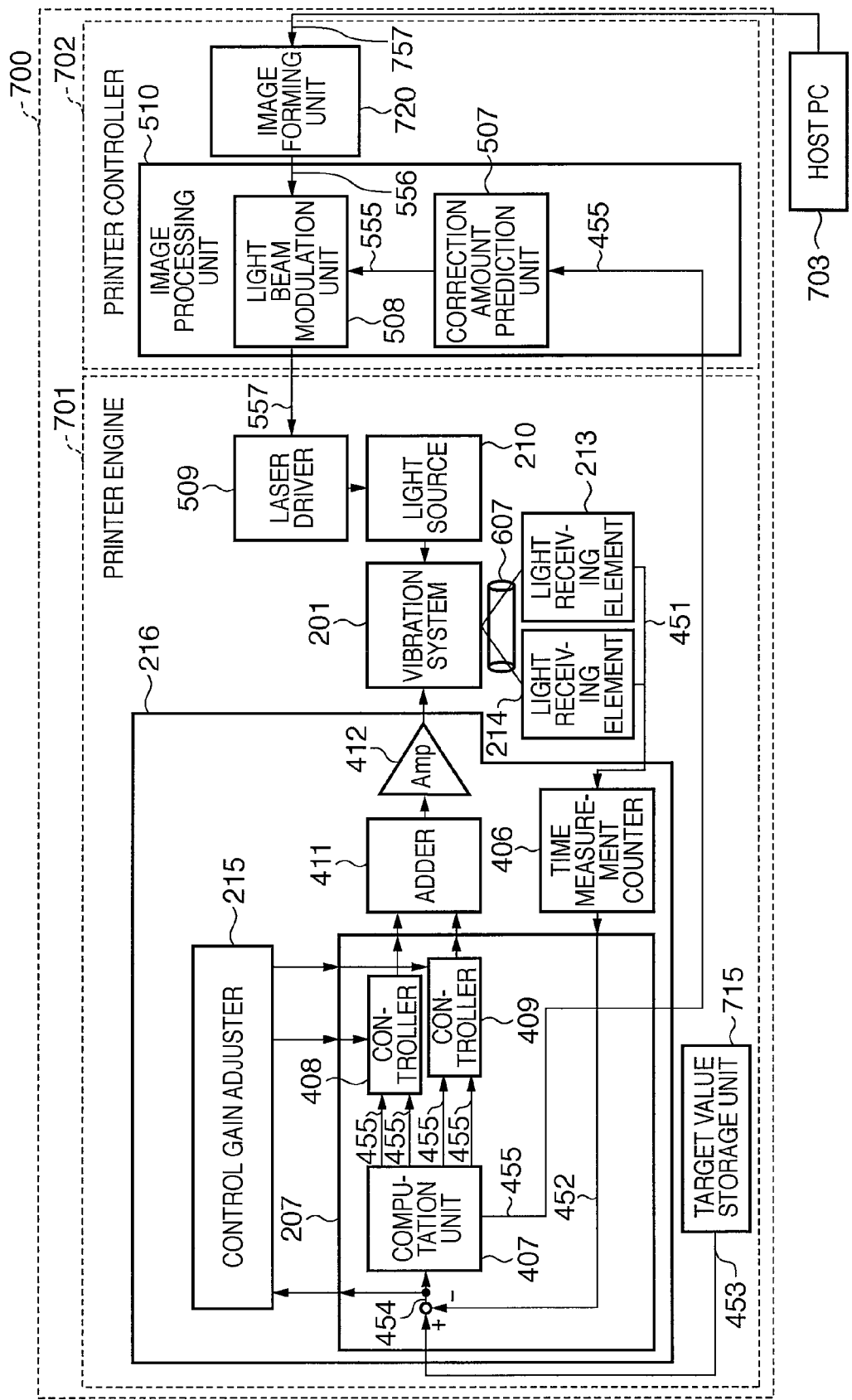
FIG. 9 is a block diagram showing still another example of the arrangement of the image forming apparatus corresponding to the embodiment of the present invention.

As shown in FIG. 9, the printer engine 701 may transmit the manipulated variable 455 to the printer controller 702, and receive the light beam driving signal 557 from the printer controller 702. In this case, the prediction unit 507 receives the manipulated variable 455 and calculates the correction amount 555.

Figure 10:
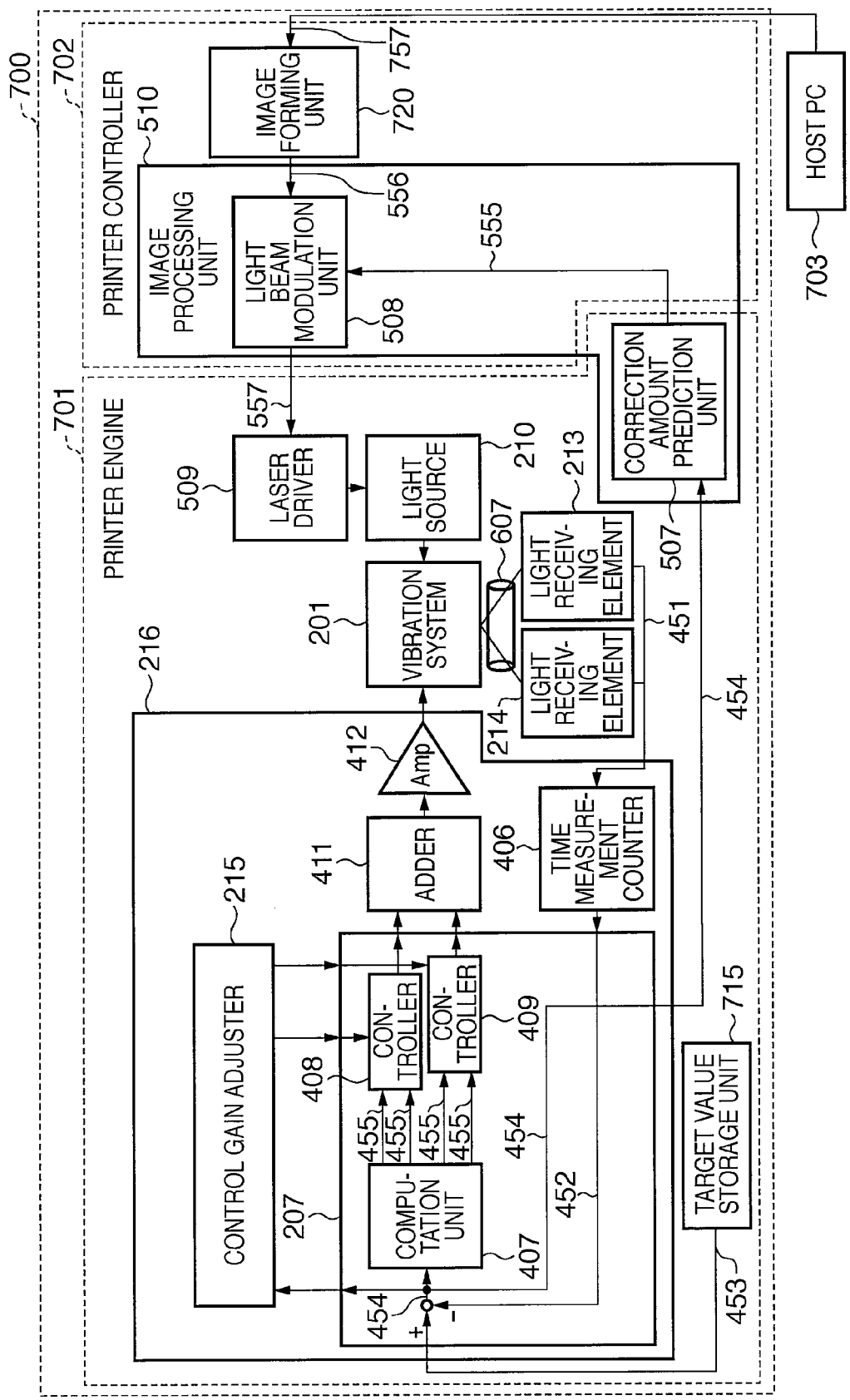
FIG. 10 is a block diagram showing yet another example of the arrangement of the image forming apparatus corresponding to the embodiment of the present invention.

As shown in FIG. 10, the printer engine 701 may have the prediction unit 507, transmit the correction amount 555 to the printer controller 702, and receive the light beam driving signal 557 from the printer controller 702. In this case, the prediction unit 507 receives the time difference 454 and calculates the correction amount 555.

Figure 11:
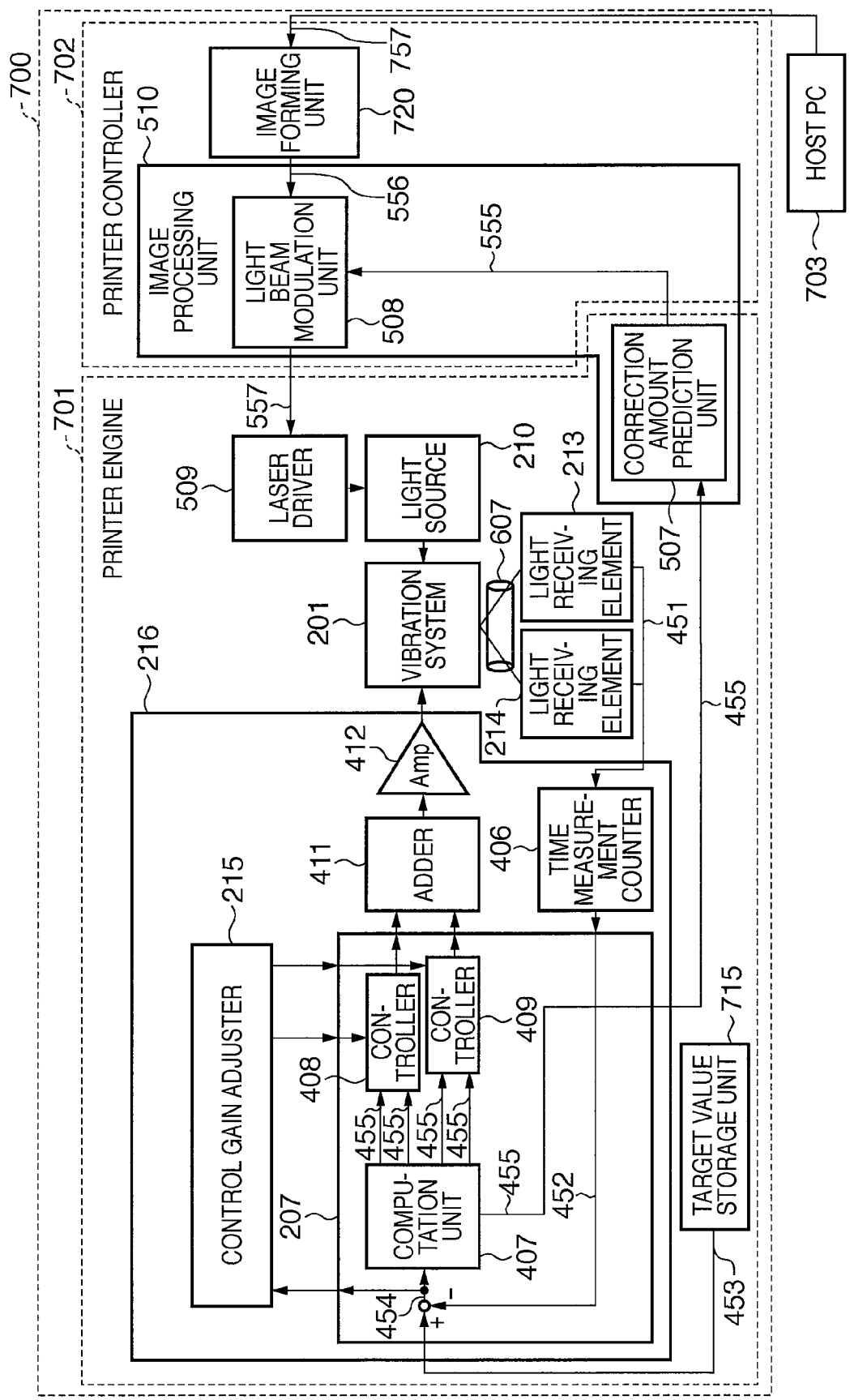
FIG. 11 is a block diagram showing still another example of the arrangement of the image forming apparatus corresponding to the embodiment of the present invention.

As shown in FIG. 11, the printer engine 701 may have the prediction unit 507, transmit the correction amount 555 to the printer controller 702, and receive the light beam driving signal 557 from the printer controller 702. In this case, the prediction unit 507 receives the manipulated variable 455 and calculates the correction amount 555.

Figure 12:
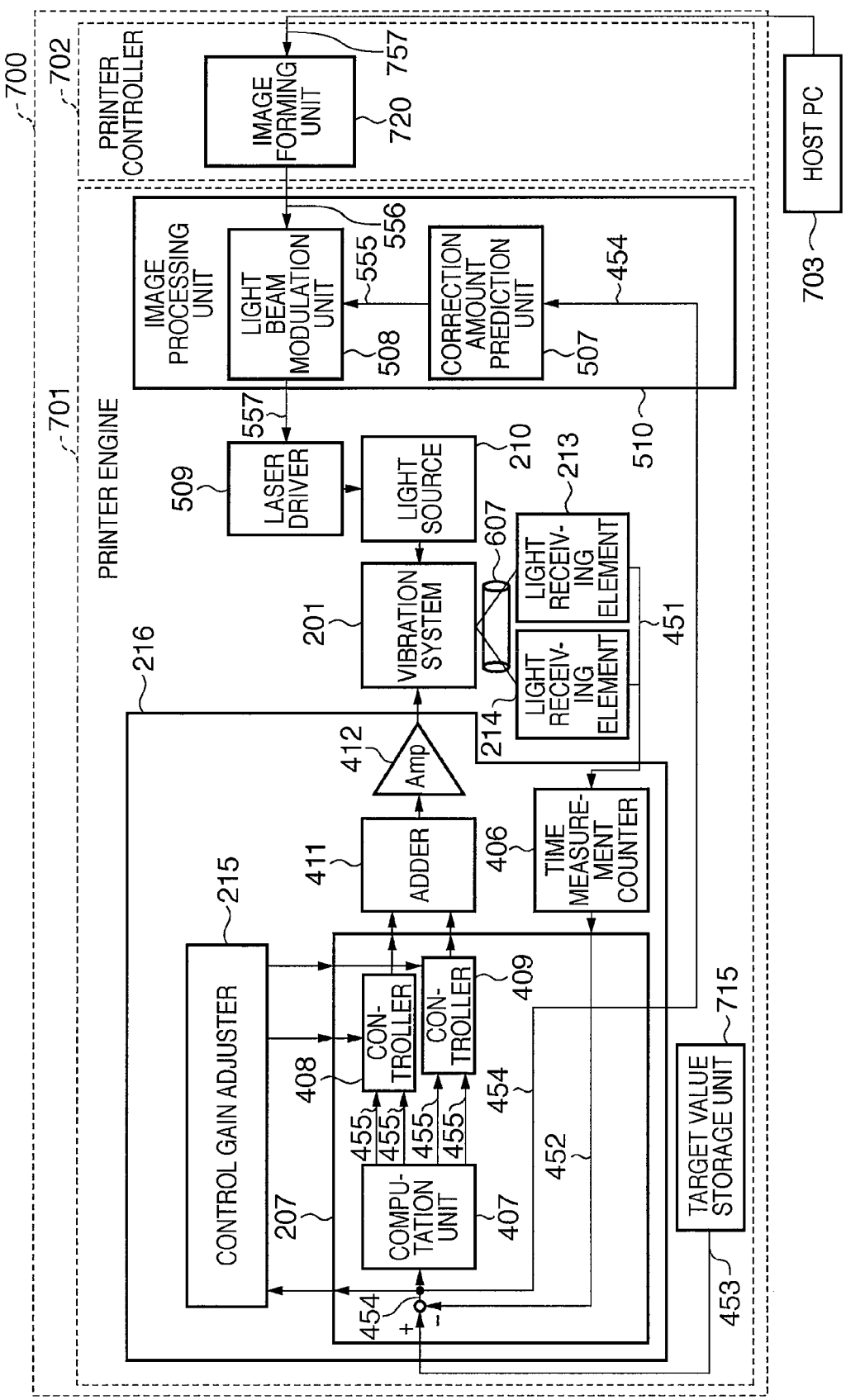
FIG. 12 is a block diagram showing yet another example of the arrangement of the image forming apparatus corresponding to the embodiment of the present invention.

As shown in FIG. 12, the printer engine 701 may have the image processing unit 510 and receive the image data 556 from the printer controller 702 without transmitting any parameter for jitter prediction to the printer controller 702. In this case, the prediction unit 507 receives the time difference 454 and calculates the correction amount 555.

Figure 13:
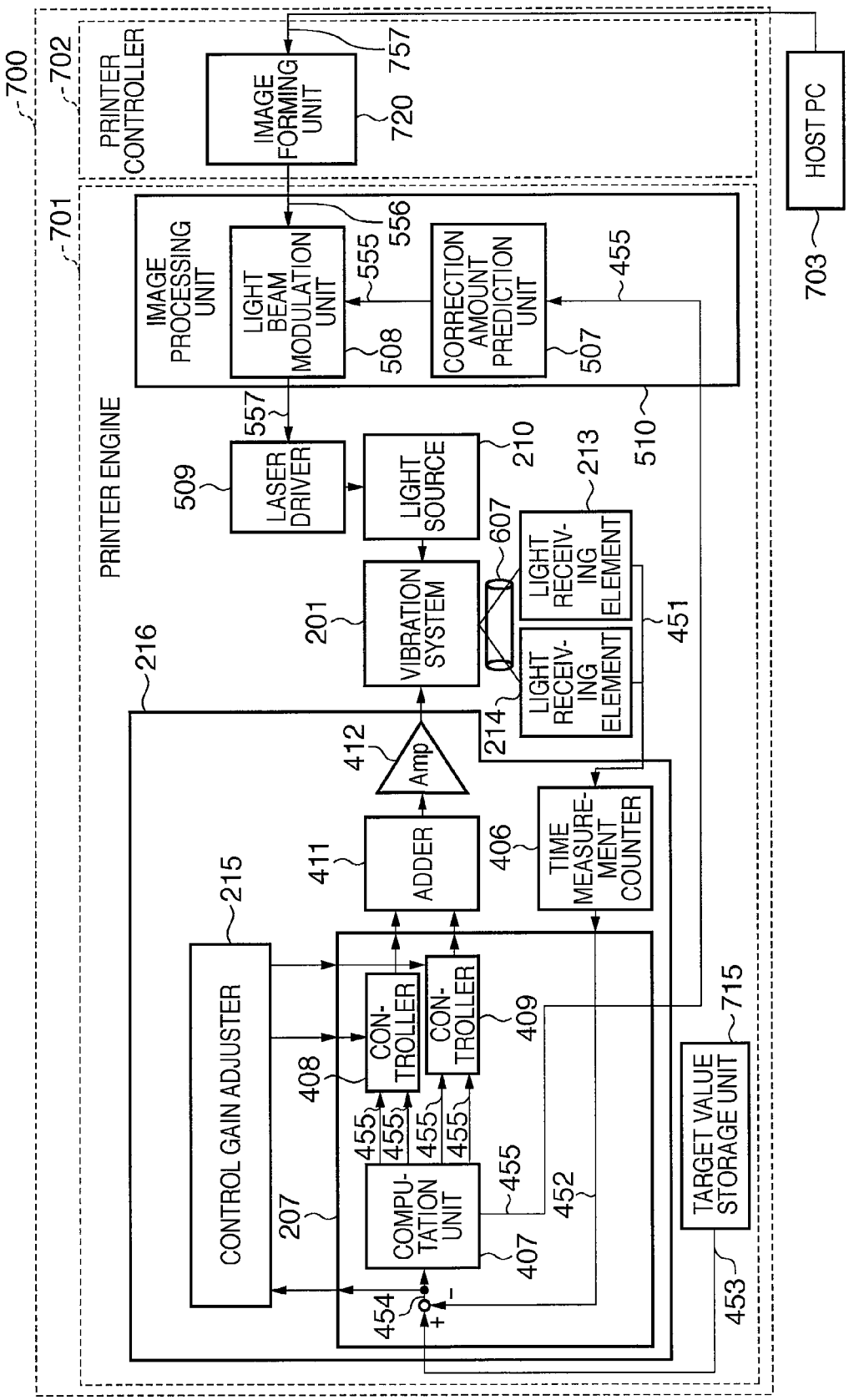
FIG. 13 is a block diagram showing still another example of the arrangement of the image forming apparatus corresponding to the embodiment of the present invention.

As shown in FIG. 13, the printer engine 701 may have the image processing unit 510 and receive the image data 556 from the printer controller 702 without transmitting any parameter for jitter measurement to the printer controller 702. In this case, the prediction unit 507 receives the manipulated variable 455 and calculates the correction amount 555.

[Operation of Deflector]

The operation of the deflector in the image forming apparatus 700 will be described next.

The arrangement of the deflector in this embodiment is the same as that shown in FIGS. 2 and 4. In addition, the deflection angle (scanning angle) $\theta$ is the same as that shown in FIG. 3.

In this embodiment, the vibration system 201 including the swing bodies 202 and 203 and the torsion springs 204 and 205 has two vibration modes. The frequencies of the two vibration modes are adjusted such that the frequency of one of the modes is almost twice that of the other mode. For example, letting I1 and I2 be the moments of inertia of the swing bodies 202 and 203, and k1/2 and k2/2 be the spring constants of the torsion springs 204 and 205, two natural angular frequencies are given by $\omega1=2\pi\times2000$ [Hz] and $\omega2=2\pi\times4000$ [Hz].

Figure 14:
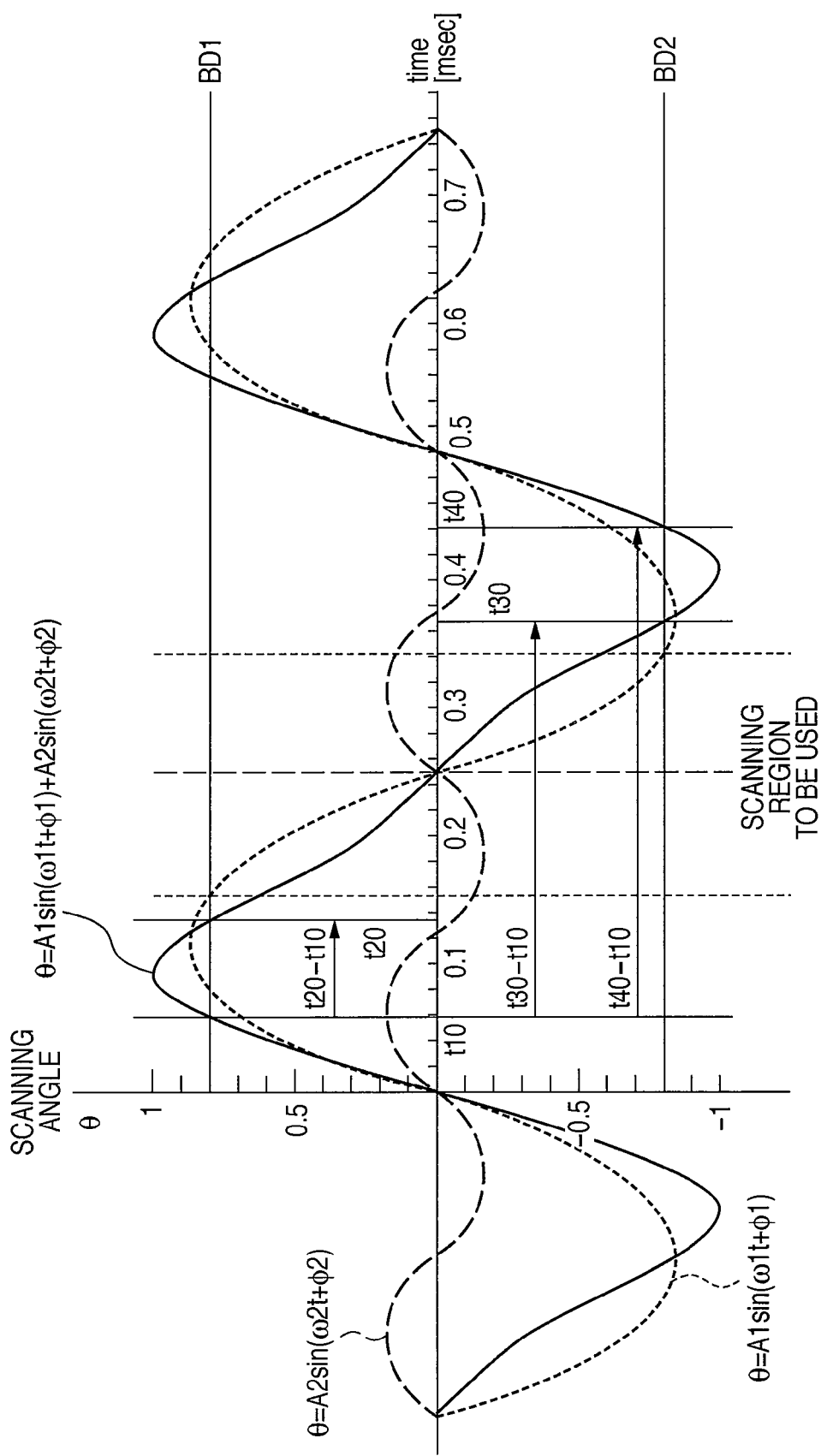
FIG. 14 is a graph showing an example of a temporal change in deflection angle in the deflector corresponding to the embodiment of the present invention.

The deflection angle $\theta$ of the deflector is expressed as equation (1). Letting A1=1, A2=0.2, $\phi1$=0, $\phi2$ =0, $\omega1=2\pi\times2000$, and $\omega2=2\pi\times4000$, a temporal change in the deflection angle $\theta$ of the deflector occurs as shown in FIG. 14. The deflection angle $\theta$ indicated by the solid line in FIG. 14 becomes closer to a sawtooth wave than a sine wave (indicated by the broken line), and can move at an almost uniform angular velocity in a certain region. In this embodiment, A1=1, A2=0.2, $\phi1$=0, $\phi2$=0, $\omega1=2\pi\times2000$, and $\omega2=2\pi\times4000$. However, it suffices to set A1, A2, $\phi1$, $\phi2$, $\omega1$, and $\omega2$ to any values as long as the change amount of angular velocity of the deflection angle is smaller than in sine wave drive in an almost uniform angular velocity region.

In this case, when the first and second light receiving elements 213 and 214 are arranged at positions symmetrical about the scan center 307 such that the deflection $\theta$ is set to 80% of A1, that is, 0.8, the following result is obtained. The target times t10, t20, t30, and t40 (see FIG. 14) at which the scanning beam 212 passes through the first and second light receiving elements 213 and 214 become 0.052 msec, 0.154 msec, 0.346 msec, and 0.448 msec, respectively. In this embodiment, the controllers 408 and 409 control driving signals to set detected times t1, t2, t3, and t4, at which the scanning beam 212 passes through the first and second light receiving elements 213 and 214, to the above desired values. This makes it possible to obtain the deflection angle $\theta$ of the deflector which is indicated by the solid line in FIG. 14. In this embodiment, the first and second light receiving elements 213 and 214 are arranged at positions symmetrical about the scan center 307 of the deflector at which the deflection angle $\theta$ is 0.8. However, they can be arranged at positions symmetrical about a position at which the deflection angle $\theta$ is an arbitrary value.

A more concrete deflection angle control method in this embodiment will be described below.

Consider relative times of times t1, t2, t3, and t4 with reference to t1. The manipulated variables $\Delta A1$, $\Delta A2$, and $\Delta\phi$ of the amplitudes and phase of the mirrors are obtained by the time differences $\Delta t2$, $\Delta t3$, and $\Delta t4$ between the detected relative times t2−t1, t3−t1, and t4−t1 and the target relative times t20−t10, t30−t10, and t40−t10 according to equation (9). The manipulated variables $\Delta A1$, $\Delta A2$, and $\Delta\phi$ of the amplitudes A1 and A2 and the relative phase $\phi$ can be calculated by equation (9) and the time differences $\Delta t2$, $\Delta t3$, and $\Delta t4$.

The controller 408 receives the manipulated variable $\Delta A1$ and the controller 409 receives the manipulated variables $\Delta A2$ and $\Delta\phi$. The adder 411 and the amplifier 412 generate a signal input to the driving mechanism (coil) 208 of the vibration system 201 and drive the vibration system 201.

The time differences $\Delta t2$, $\Delta t3$, and $\Delta t4$ are sent to the adjuster 215. The adjuster 215 sends signals for changing control gains as parameters to the controllers 408 and 409 based on the time differences $\Delta t2$, $\Delta t3$, and $\Delta t4$ so as to set an evaluation function having $\Delta t2$, $\Delta t3$, and $\Delta t4$ as variables to an optimal value.

In this embodiment, t1, t2, t3, t4, t10, t20, t30, and t40 are described as fixed values. However, each value can have a predetermined range. In addition, t20−t10, t30−t10, and t40−t10 are described as fixed values. However, each value can have a certain range. In the embodiment, t1, t2, t3, t4, t10, t20, t30, and t40 are handled as times. However, they can be counter values set with reference to clocks. These also apply to the following embodiments.

Letting N be the number of times of measurement, n be the number of time differences, m be a natural number, and Wi be an arbitrary non-negative real number which represents a weight, an evaluation function J having the time differences $\Delta t2$, $\Delta t3$, and $\Delta t4$ can be expressed as follows:

$$J = \sum_{k}^{N}\left(\sum_{i}^{n}\frac{W_i|\Delta T_i(k)|^m}{N}\right) \quad (10)$$

Assume that in this embodiment, N=1, m=2, and Wi=1. In addition, n=3 and the evaluation function is expressed as follows:

$$J=(\Delta t2)^2+(\Delta t3)^2+(\Delta t4)^2 \quad (11)$$

Control gains are determined so as to minimize the evaluation function J. Assume that the controllers 408 and 409 form PI controllers for A1, A2, and φ, respectively, and that ΔA1 is input to the controller 408, ΔA2 and Δφ are input to the controller 409, and A1def, A2def, and Aφdef are fixed values. In this case, the respective outputs are expressed by:

$$K1(1+K1'/s)\Delta A1 + A1def \quad (12)$$

$$K2(1+K2'/s)\Delta A2 + A2def \quad (13)$$

$$K3(1+K3'/s)\Delta\phi + \phi def \quad (14)$$

where K1, K2, K3, K1', K2', and K3' are control gains, respectively, and K1', K2', and K3' indicate the reciprocals of the integration times of the PI controllers. This embodiment adjusts only K1, K2, and K3 by using an evaluation function without adjusting K1', K2', and K3'.

This apparatus performs the operation of setting, as controls gains for the controllers 408 and 409, predetermined x control gain candidates K1$p$ (p is a natural number from 1 to x), y control gain candidates K2$q$ (q is a natural number from 1 to y), and z control gain candidates K1$r$ (r is a natural number from 1 to z). There are x*y*z combinations of these values.

Processing corresponding to this embodiment will be described below with reference to the flowchart of FIG. 15.

Figure 15:
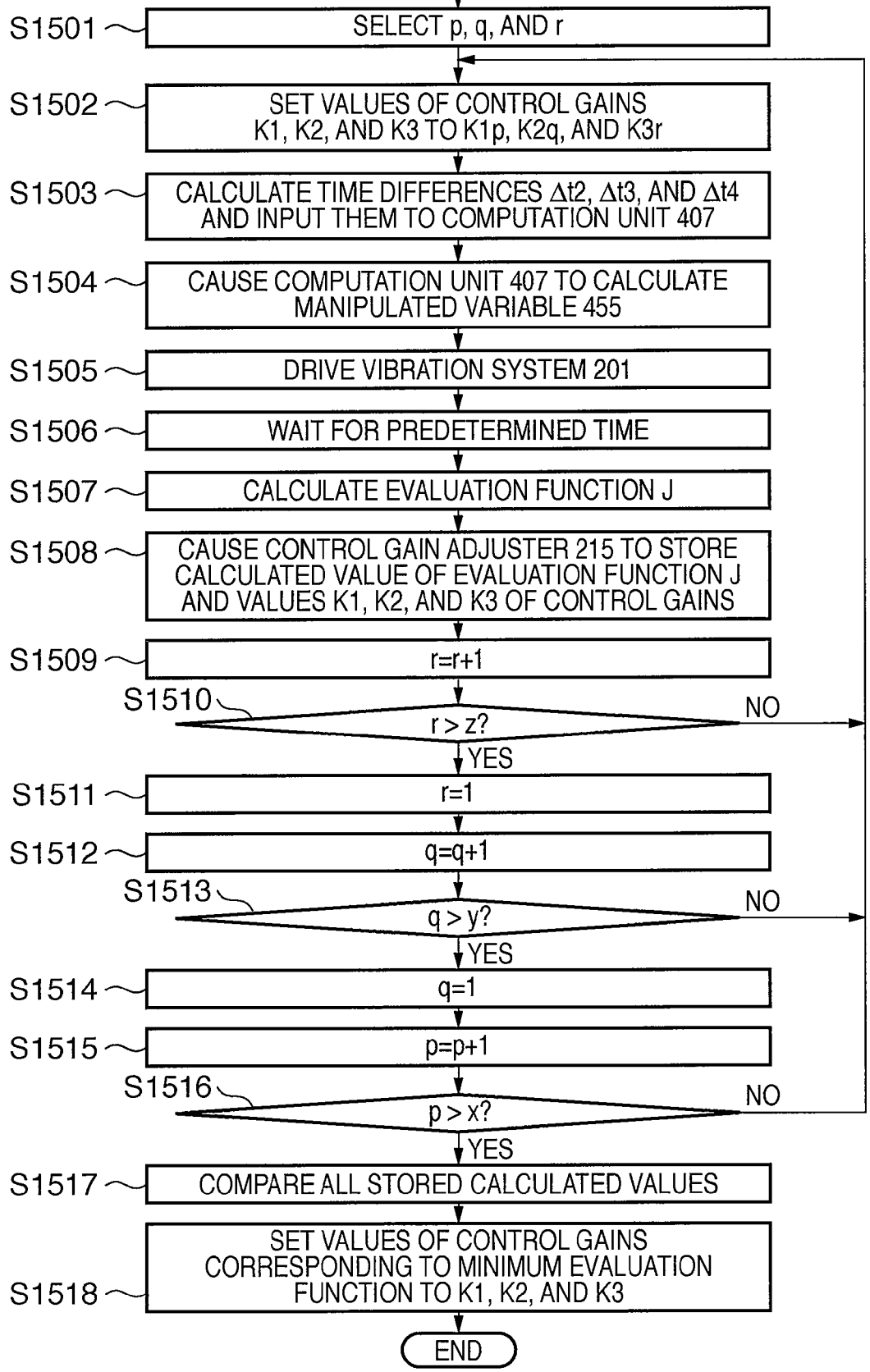
FIG. 15 is a flowchart showing an example of the processing of adjusting control gains in the deflector corresponding to the embodiment of the present invention.

Referring to FIG. 15, in step S1501, one combination of control gain candidates (e.g., p=q=r=1) is selected as control gains. In step S1502, the value of the control gain K1 is set to K1=K1$p$, the value of the control gain K2 is set to K2=K2$q$, and the value of the control gain K3 is set to K3=K3$r$.

In step S1503, the time differences Δt2, Δt3, and Δt4 are calculated from the differences between the times measured by the counter 406 and the target times and are input to the computation unit 407. In step S1504, the computation unit 407 calculates the manipulated variable 455 based on the input time difference information. In step S1505, the controllers 408 and 409, the adder 411, and the amplifier 412 generate a signal to be input to the driving mechanism (coil) 208 of the vibration system 201 to drive the vibration system 201.

After the control gains are changed, the vibrational motion of the vibration system 201 is controlled. In step S1506, the process waits until a predetermined time elapses. In step S1507, the evaluation function J based on equation (11) is calculated by using the values obtained by measuring the time differences Δt2, Δt3, and Δt4 N times. This embodiment exemplifies the case of N=1, and hence uses the values obtained by one measurement. In step S1508, the adjuster 215 stores the value obtained by calculating the evaluation function J and the combination of the control gains K1, K2, and K3.

In step S1509, the adjuster 215 updates the value r to r=r+1 to set control gains for the controllers 408 and 409 again. If r=1 has been set, the value r is updated to r=2. In step S1510, the value r after updating in step S1509 is compared with a candidate count z of the control gain candidates K1$r$, and it is determined whether r is larger than z. If r>z (YES in step S1510), the process shifts to step S1511.

If r is equal to or smaller than z, the process returns to step S1502 to continue the above processing. In this case, in step S1502, the adjuster 215 transmits signals for updating settings to the controllers 408 and 409 to set control gains for the controllers 408 and 409 again. If p=1, q=1, and r=2, the control gains are set to K1=K11, K2=K21, and K3=K32.

In step S1511, r is set to 1 again. In step S1512, q is updated to q+1. In step S1513, q after updating in step S1512 is compared with a candidate count y of the control gain candidates K2$q$, and it is determined whether q is larger than y. If q>y (YES in step S1513), the process shifts to step S1514.

If q is equal to or smaller than y, the process returns to step S1502 to continue the above processing. In this case, in step S1502, the adjuster 215 transmits signals for updating settings to the controllers 408 and 409 to set control gains for the controllers 408 and 409 again. If p=1, q=2, and r=1, the control gains are set to K1=K11, K2=K22, and K3=K31.

In step S1514, q is updated to 1. In step S1515, p is updated to p+1. In step S1516, p after updating in step S1515 is compared with a candidate count x of the control gain candidates K1$p$, and it is determined whether p is larger than x. If p>x (YES in step S1516), the process shifts to step S1517.

If p is equal to or smaller than x, the process returns to step S1502 to continue the above processing. In this case, in step S1502, the adjuster 215 transmits signals for updating the settings to the controllers 408 and 409 to set control gains for the controllers 408 and 409 again. If p=2, q=1, and r=1, the control gains are set to K1=K12, K2=K21, and K3=K31.

In this manner, all the combinations of control gain candidates from (p, q, r)=(1, 1, 1) to (x, y, z) can be set as control gains, and sets of control gain candidates and the calculated values of the evaluation function J are stored in the adjuster 215 in correspondence with each other. In step S1517, all the calculated values of the evaluation function J stored in the adjuster 215 are compared with each other. In step S1518, control gain candidates which obtain a minimum calculated value are set to the actual control gains K1, K2, and K3. This processing is then terminated. Optical deflection is performed by using the control gains set in this manner.

[First Modification]

According to the above description, the adjuster 215 stores all the combinations of the control gain candidates K1$p$, K2$q$, and K3$r$ and the calculated values of the evaluation function J, and a combination of control gains which minimize the evaluation function J is selected. However, it suffices to perform the following operation by making the adjuster 215 store only one combination of the evaluation function J and control gain candidates.

That is, only when the control gain candidates K1$p$, K2$q$, and K3$r$ are changed and the corresponding value of the evaluation function J is smaller than the stored evaluation function J, the adjuster 215 stores the combination of the evaluation function J and the control gain candidates at this time upon overwriting the previous values. In this case as well, the control gain candidates K1$p$, K2$q$, and K3$r$ which minimize the evaluation function J can be obtained.

[Second Modification]

In this embodiment, the controllers 408 and 409 are used as PI controllers to determine one combination of optimal control gains. The controllers 408 and 409 may be P controllers. In this case, setting K1', K2', and K3' to 0 can implement the same arrangement as that of this embodiment.

[Third Modification]

This embodiment exemplifies the arrangement which adjusts only K1, K2, and K3 without adjusting the control gains K1', K2', and K3'. The arrangement of the embodiment can be applied to even a case in which all the control gains K1', K2', and K3' are changed in addition to K1, K2, and K3, without changing the fundamental arrangement. In this case, only the number of combinations of control gains increases.

For example, if the candidate numbers of control gains K1', K2', and K3' are x', y', and z', respectively, it suffices to consider x*y*z*x'*y'*z' combinations.

[Fourth Modification]

In this embodiment, the time differences are defined as Δti=ti−ti0=(ti−t1)−(ti0−t10) (i=2, 3, 4), and the evaluation function is defined as equation (10). However, it suffices to define the time differences as $\Delta t_i = t_i - t_{i0}$ ($i=2, 3, 4$) and use the evaluation function expressed by equation (10).

Figure 16:
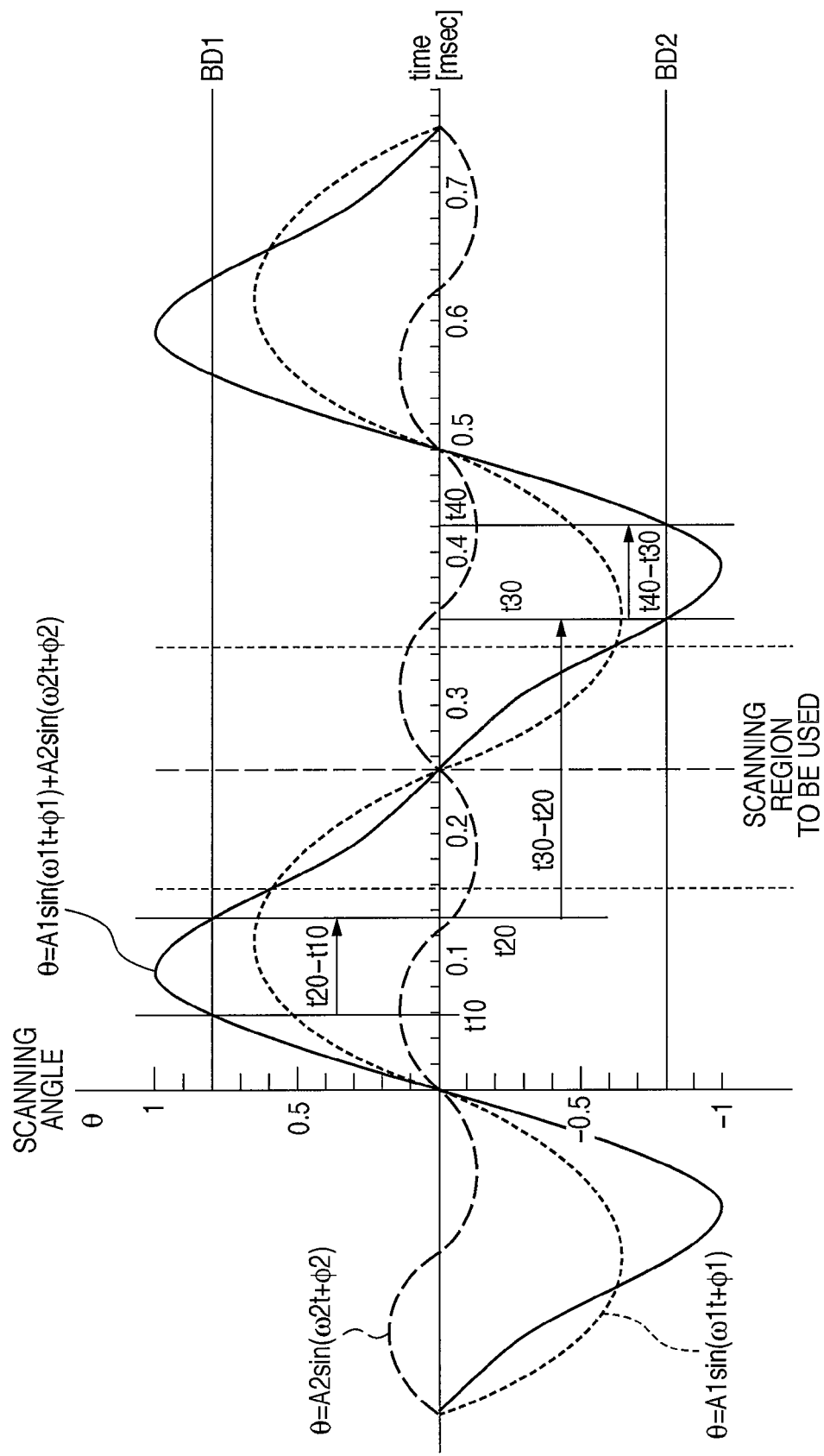
FIG. 16 is a graph showing another example of a temporal change in deflection angle in the deflector corresponding to the embodiment of the present invention.

In addition, even if the time differences $\Delta t_i$ ($i=2, 3, 4$) are set as $\Delta t_2 = t_2 - t_1$, $\Delta t_3 = t_3 - t_2$, and $\Delta t_4 = t_4 - t_3$, as shown in FIG. 16, the control gains can be adjusted by using the evaluation function in the same manner as described above. Since weighting is performed by using Wi in the evaluation function J expressed by equation (10), the present invention can be applied to even a case in which the definition of $\Delta t_i$ is different from that in this embodiment. When the definition of $\Delta t_i$ is to be changed, it is necessary to change the matrix computations represented by equations (8) and (9).

[Fifth Modification]

In this embodiment, control gains for optimizing the evaluation function J are set. Assume that an optimal evaluation function is obtained. Even in this case, if at least one time difference (e.g., $\Delta t_2$) falls outside a set range, there is a possibility that desired optical scanning may not be implemented. In this case, even if an optimal (minimum) evaluation function is obtained, since desired optical scanning cannot be implemented, the corresponding values are not appropriate as control gains.

When each or a certain one of the time differences $\Delta t_i$ falls outside a set range, it suffices not to set the corresponding values of control gains in the controllers again regardless of the value of the evaluation function at this time.

In this case, it suffices to have a comparison step of comparing the time differences with a set range and inhibit the value of an evaluation function and a combination of the values of control gains from being stored in step S1508 when the time difference falls outside the set range. Alternatively, even if these values are stored, they may be excluded from comparison targets in step S1517. This also applies to the other modifications.

[Sixth Modification]

This embodiment changes each of three control gains and searches for a combination of optimal control gains. As a method of optimizing the evaluation function J without limiting the number of control gains to be changed, the following methods can be provided other than the method executed in this embodiment.

There are available an experimental design method, quality engineering technique, response surface methodology, sensitivity analysis, Newton's method, quasi-Newton's method, steepest descent method, conjugate gradient method, neural network technique, annealing method, taboo search method, genetic algorithm, and the like. That is, the deflector in the present invention is not limited to any specific method. When many control gains are to be changed, it suffices to select an optimization technique in consideration of the convergence of a solution and its calculation time. This also applies to the other embodiments.

Using the above technique or the like which optimizes the evaluation function J can decrease the number of times of changing of gains. This can shorten the time required for gain adjustment and quickly reach optimal gains.

[Seventh Modification]

In this embodiment, the deflector calculates the manipulated variables $\Delta A_1$, $\Delta A_2$, and $\Delta \phi$ from the time differences $\Delta t_2$, $\Delta t_3$, and $\Delta t_4$ according to equation (9). In contrast to this, it suffices to perform driving control by using only the manipulated variable $\Delta \phi$. In this case, $\Delta A_1$ and $\Delta A_2$ are set to 0 regardless of the calculation result obtained by equation (9). Alternatively, driving control is performed by using only the manipulated variables $\Delta A_1$ and $\Delta A_2$. In this case, $\Delta \phi$ is set to 0 regardless of the calculation result obtained by equation (9).

[Operation of Light Beam Driving Mechanism]

The operation of the light beam driving mechanism of the image forming apparatus 700 according to the embodiment of the present invention will be described next.

The light beam driving unit in this embodiment has the same arrangement as that shown in FIG. 5. The prediction unit 507 predicts the correction amount 555 in the next scan by using the time differences $\Delta t_2$, $\Delta t_3$, and $\Delta t_4$ between the three detected relative times $t_2 - t_1$, $t_3 - t_1$, and $t_4 - t_1$ and the three target relative times $t_{20} - t_{10}$, $t_{30} - t_{10}$, and $t_{40} - t_{10}$. An nth-line jitter amount $E(n)$ in a scanning region is represented by the following equation using $t_2$ and $t_3$ on the nth line:

$$E(n) = (t_{30} - t_{20}) - (t_3(n) - t_2(n)) \quad (15)$$

Assume that in this embodiment, the (n+1)th-line jitter amount is equal to the nth-line jitter amount. Therefore, a jitter amount on an immediately preceding line is used as a predictive value without any change. That is, the prediction unit 507 computes equation (15) for each line and transmits the computation value as the correction amount 555 for the next line to the modulation unit 508.

The modulation unit 508 reduces the main-scan width of the image data 556 based on the correction amount 555 provided for each line when it is predicted that the scan width with jitter is larger than a target scan width (when the correction amount 555 is negative). In contrast, when it is predicted that the scan width with jitter is smaller than the target scan width (when the correction amount 555 is positive), the main-scan width of the image data 556 is increased.

As described above, an enlargement/reduction magnification $M(n+1)$ on the (n+1)th line is expressed by $$M(n+1) = (t_{30} - t_{20}) / ((t_{30} - t_{20}) - E(n)) \quad (16)$$

It suffices to use a known technique as a method of correcting a total magnification in the main-scan direction to perform enlargement/reduction correction. That is, the present invention can use the technique disclosed in Japanese Patent Laid-Open No. 11-327249, which intermittently increases or decreases the pulse width of a light beam, or the technique disclosed in Japanese Patent Laid-Open Nos. 2004-268569 and 62-243467, which adjusts the frequency of a PLL which supplies pixel clocks.

As described above, simultaneously performing driving control on the deflector and image processing by the light beam driving unit for each line will reduce low-frequency component jitter in the main-scan direction which is generated for each line. This makes it possible to keep image formation positions on end portions on a transfer medium in the sub-scan direction in a better state, which are difficult to align with each other by only driving control, and to keep image formation positions at the center on the transfer medium in a better state, which are difficult to align with each other by only image processing.

Figure 1:
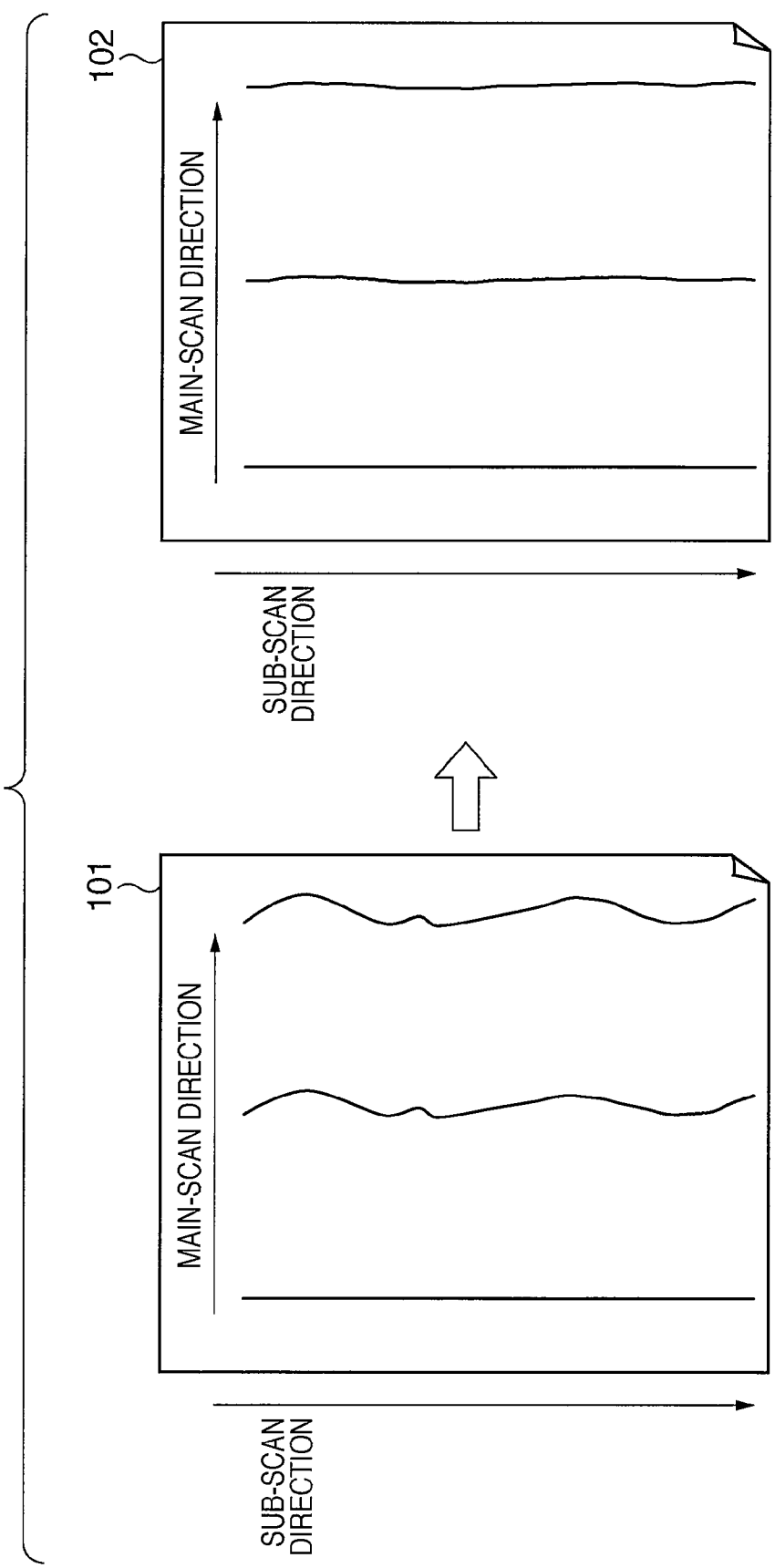
FIG. 1 is a view showing the comparison between image quality deterioration due to the jitter of a swing mirror and an effect of the present invention.

According to the present invention described above, it is possible to perform control in driving control so as to reduce the deviation between the vibration of the swing body and a target vibration waveform. In addition, in image processing, it is possible to predict nonperiodic jitter for each scan from time difference information and modulate a light beam in accordance with the prediction. Combining these operations makes it possible to further reduce low-frequency component jitter in the main-scan direction which is generated for each line as indicated by the transfer medium 102 in FIG. 1 and to keep image formation positions at the center and end portions on a transfer medium in the sub-scan direction in a better state.

[Other Exemplary Embodiments]

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181449, filed Jul. 10, 2007, which is hereby incorporated by reference herein in its entirety.

What is claimed is:

1. An image forming apparatus which forms an image by scanning a light beam in a main-scan direction of a photosensitive member, said apparatus comprising:
   an output unit configured to irradiate a light beam for exposing the photosensitive member;
   a deflection unit configured to deflect a light beam from said output unit to scan the photosensitive member in the main-scan direction;
   a light-receiving unit configured to detect the light beam deflected by said deflection unit;
   a computation unit configured to calculate difference information by using information of a detected time based on a timing at which the light beam is detected by said light-receiving unit;
   a control unit configured to drive said deflection unit by setting a parameter for controlling operation of said deflection unit based on the difference information;
   a prediction unit configured to predict a correction amount of a scan width in the main-scan direction in a next scan based on the difference information;
   a modulation unit configured to generate a driving signal for driving said output unit based on image data and the correction amount; and
   a driving unit configured to drive said output unit based on the driving signal.

2. The apparatus according to claim 1, wherein
   the parameter includes a control gain for driving said deflection unit,
   said control unit includes an adjustment unit configured to select one of a plurality of control gain candidates based on the plurality of pieces of the difference information calculated when said deflection unit is driven upon application of each of the plurality of control gain candidates, and
   said control unit drives said deflection unit using the selected control gain candidate as the control gain.

3. The apparatus according to claim 2, wherein said adjustment unit selects one of the plurality of control gain candidates based on a calculation value of an evaluation function using the difference information as a variable.

4. The apparatus according to claim 2, wherein when one of the plurality of pieces of the difference information calculated when said deflection unit is driven upon application of each of the plurality of control gain candidates falls outside a predetermined range, the control gain candidate corresponding to the difference information is excluded from targets for the selection by said adjustment unit.

5. The apparatus according to claim 2, wherein
   said deflection unit includes a vibration system which performs a vibrational motion,
   the parameter further includes a manipulated variable of at least one of an amplitude and a phase of the vibrational motion,
   said control unit further includes a computation unit configured to calculate the manipulated variable based on the difference information, and
   said control unit drives said deflection unit using the calculated manipulated variable and the control gain.

6. The apparatus according to claim 1, wherein
   said light-receiving unit includes a first light-receiving unit and a second light-receiving unit,
   the information of the detected time includes a first timing at which the light beam is detected by the first light-receiving unit, a second timing at which the light beam is detected next by the first light-receiving unit after the first timing, a third timing at which the light beam is detected by the second light-receiving unit after the second timing, and a fourth timing at which the light beam is detected next by the second light-receiving unit after the third timing, and
   the difference information is calculated by further using information of a target time for each of the first timing, the second timing, the third timing, and the fourth timing.

7. The apparatus according to claim 1, wherein said prediction unit predicts an enlargement/reduction magnification of the scan width as the correction amount.

8. The apparatus according to claim 1, wherein said prediction unit predicts the correction amount for each scan.

9. A control method for an image forming apparatus which comprises an output unit which irradiates a light beam for exposing a photosensitive member, a deflection unit which deflects a light beam from the output unit to scan the photosensitive member in the main-scan direction, and a light-receiving unit which detects the light beam deflected by the deflection unit, and forms an image by scanning a light beam in the main-scan direction of the photosensitive member, the method comprising:
- a difference computation step of calculating difference information by using information of a detected time based on a timing at which the light beam is detected by the light-receiving unit;
- a control step of driving the deflection unit upon setting a parameter for controlling operation of the deflection unit based on the difference information;
- a prediction step of predicting a correction amount for a scan width in the main-scan direction in a next scan based on the difference information;
- a modulation step of generating a driving signal for driving the output unit based on image data and the correction amount; and
- a driving step of driving the output unit based on the driving signal.

10. The method according to claim 9, wherein
the parameter includes a control gain for driving the deflection unit,
the control step includes an adjustment step of selecting one of a plurality of control gain candidates based on the plurality of pieces of the difference information calculated when the deflection unit is driven upon application of each of the plurality of control gain candidates, and
the deflection unit is driven by using the selected control gain candidate as the control gain.

11. The method according to claim 10, wherein in the adjustment step, one of the plurality of control gain candidates is selected based on a calculation value of an evaluation function using the difference information as a variable.

12. The method according to claim 10, wherein when one of the plurality of pieces of the difference information calculated when the deflection unit is driven upon application of each of the plurality of control gain candidates falls outside a predetermined range, the control gain candidate corresponding to the difference information is excluded from targets for the selection in the control gain adjustment step.

13. The method according to claim 10, wherein
the deflection unit includes a vibration system which performs vibrational motion,
the parameter further includes a manipulated variable of at least one of an amplitude and a phase of the vibrational motion,
the control step further includes a computation step of calculating the manipulated variable based on the difference information, and
the deflection unit is driven by using the calculated manipulated variable and the control gain.

14. The method according to claim 9, wherein
the light-receiving unit includes a first light-receiving unit and a second light-receiving unit,
information of the detected time includes a first timing at which the light beam is detected by the first light-receiving unit, a second timing at which the light beam is detected next by the first light-receiving unit after the first timing, a third timing at which the light beam is detected by the second light-receiving unit after the second timing, and a fourth timing at which the light beam is detected next by the second light-receiving unit after the third timing, and
the difference information is calculated by further using information of a target time for each of the first timing, the second timing, the third timing, and the fourth timing.

15. The method according to claim 9, wherein in the prediction step, an enlargement/reduction magnification of the scan width is predicted as the correction amount.

16. The method according to claim 9, wherein in the prediction step, the correction amount is predicted for each scan.

* * * * *